US012682560B2

(12) United States Patent　　(10) Patent No.: US 12,682,560 B2
Nagao　　(45) Date of Patent: Jul. 14, 2026

(54) THREE-DIMENSIONAL SHAPE GENERATION APPARATUS, THREE-DIMENSIONAL SHAPE GENERATION SYSTEM, THREE-DIMENSIONAL SHAPE GENERATION METHOD, AND NON-TRANSITORY RECORDING MEDIUM

(71) Applicant: Kagehiro Nagao, Kanagawa (JP)

(72) Inventor: Kagehiro Nagao, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 219 days.

(21) Appl. No.: 18/432,502

(22) Filed: Feb. 5, 2024

(65) Prior Publication Data

US 2024/0320910 A1　　Sep. 26, 2024

(30) Foreign Application Priority Data

Mar. 20, 2023　(JP) ................................. 2023-043968

(51) Int. Cl.
*G06T 17/00* (2006.01)
*G06T 7/11* (2017.01)
*G06T 7/30* (2017.01)
*G06T 7/50* (2017.01)

(52) U.S. Cl.
CPC ............... *G06T 17/00* (2013.01); *G06T 7/11* (2017.01); *G06T 7/30* (2017.01); *G06T 7/50* (2017.01); *G06T 2207/10028* (2013.01); *G06T 2210/04* (2013.01); *G06T 2210/56* (2013.01)

(58) Field of Classification Search
None
See application file for complete search history.

(56) References Cited

U.S. PATENT DOCUMENTS

2017/0185849 A1* 6/2017 High ...................... G06V 20/52
2018/0181789 A1* 6/2018 Metzler .............. G06V 30/1916
2018/0218510 A1* 8/2018 Taguchi ................... G06T 7/55
2021/0398347 A1* 12/2021 Porter .................... G06T 17/05
(Continued)

FOREIGN PATENT DOCUMENTS

CN 　　107978017 A 　5/2018
JP 　　2019101694 A 　6/2019
JP 　　2023103167 A 　7/2023

OTHER PUBLICATIONS

Extended European Search Report dated Jul. 25, 2024 issued in corresponding European Appln. No. 24159197.3.
(Continued)

*Primary Examiner* — Frank S Chen
(74) *Attorney, Agent, or Firm* — Harness, Dickey & Pierce, P.L.C.

(57) ABSTRACT

A three-dimensional shape generation apparatus includes circuitry to generate three-dimensional shape information indicating a three-dimensional shape corresponding to a three-dimensional point cloud, using model shape information indicating a three-dimensional model shape. The model shape information includes model shape information of a frame, and the circuitry generates three-dimensional shape information of a frame using the model shape information of the frame based on point cloud information indicating the three-dimensional point cloud.

20 Claims, 21 Drawing Sheets

3D SHAPE GENERATION SYSTEM 1

MANAGEMENT SERVER 5

100

COMMUNICATION NETWORK

COMMUNICATION TERMINAL 3

(56) References Cited

U.S. PATENT DOCUMENTS

2023/0099463 A1 *  3/2023  Xu ...................... G06V 10/255
                                                  703/1
2023/0222730 A1   7/2023  Motohashi et al.

OTHER PUBLICATIONS

Malihi, S. et al. "Window Detection from UAS-Derived Photogram-metric Point Cloud Employing Density-Based Filtering and Perceptual Organization." Remote Sensing, vol. 10, No. 1320 (2018): pp. 1-22.
Zhang, X. et al. "A Semantics-aware Method for Adding 3D Window Details to Textured LoD2 CityGML Models." 2022 International Conference on Cyberworlds (CW), IEEE (2022): pp. 63-70.

* cited by examiner

3D SHAPE GENERATION SYSTEM 1

FIG. 4

| USER ID | POINT CLOUD DATA | PROCESSING HISTORY |
|---|---|---|
| 1 | XXXXXX<br><br>XXXXXX<br><br>XXXXXX | MONTH DAY, YEAR<br>·PROCESSING HISTORY : REGISTRATION, DENOISING, SEGMENTATION, MODELING<br>×SELECTED MODEL<br>  PIPING (MODEL A), DESK<br><br>MONTH DAY, YEAR<br>  · · · · |
| 2 | XXXXXX<br><br>XXXXXX<br><br>XXXXXX | MONTH DAY, YEAR<br>  · · · · |

THREE-DIMENSIONAL SHAPE GENERATION APPARATUS, THREE-DIMENSIONAL SHAPE GENERATION SYSTEM, THREE-DIMENSIONAL SHAPE GENERATION METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2023-043968, filed on Mar. 20, 2023, in the Japan Patent Office, the entire disclosure of which is hereby incorporated by reference herein.

BACKGROUND

Technical Field

Embodiments of the present disclosure relate to a three-dimensional shape generation apparatus, a three-dimensional shape generation system, a three-dimensional shape generation method, and a non-transitory recording medium.

Related Art

A locating apparatus known in the art identifies the location of an object in a building. The locating apparatus includes a point-cloud data acquisition unit, a three-dimensional (3D) model data acquisition unit, an object-for-check extraction unit, an object-match-point finding unit, and a subject locating unit. The point-cloud data acquisition unit acquires point-cloud data from point-cloud data acquisition means for acquiring point-cloud data representing depth information about a predetermined measuring range. The 3D model data acquisition unit acquires 3D model data of a building structure in which a subject is present from 3D model data storage means storing 3D model data of the building structure. The object-for-check extraction unit extracts, from the point-cloud data, an object-for-check to be checked against the 3D model data. The object-match-point finding unit finds an object-match-point within the 3D model data by checking the 3D model data against the object-for-check. The subject locating unit identifies the location of the subject based on the information of the object-match-point in the 3D model data and the depth information of the point-cloud data.

SUMMARY

In one aspect, a three-dimensional shape generation apparatus includes circuitry to generate three-dimensional shape information indicating a three-dimensional shape corresponding to a three-dimensional point cloud, using model shape information indicating a three-dimensional model shape. The model shape information includes model shape information of a frame, and the circuitry generates three-dimensional shape information of a frame using the model shape information of the frame based on point cloud information indicating the three-dimensional point cloud.

In another aspect, a three-dimensional shape generation system includes the three-dimensional shape generation apparatus described above and a communication terminal. The circuitry of the three-dimensional shape generation apparatus transmits the three-dimensional shape information of the frame to the communication terminal. The communication terminal includes circuitry to receive the three-dimensional shape information of the frame from the three-dimensional shape generation apparatus, and display the three-dimensional shape information of the frame on a display.

In another aspect, a method for generating a three-dimensional shape includes generating three-dimensional shape information indicating a three-dimensional shape corresponding to a three-dimensional point cloud, using model shape information indicating a three-dimensional model shape. The model shape information includes model shape information of a frame. The generating includes generating three-dimensional shape information of a frame using the model shape information of the frame based on point cloud information indicating the three-dimensional point cloud.

In another aspect, a non-transitory recording medium stores a plurality of program codes which, when executed by one or more processors, causes the one or more processors to perform the method described above.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 4 is a conceptual diagram illustrating a setting information management table according to an embodiment of the present disclosure;

FIGS. 11A to 11C are diagrams each illustrating model checking and transformation according to an embodiment of the present disclosure;

FIGS. 15A to 15D are diagrams each illustrating 3D shape information of a frame and a transparent member according to an embodiment of the present disclosure;

FIGS. 20A and 20B are diagrams each illustrating the signal intensity of point clouds corresponding to a frame according to a modification of the above embodiments of the present disclosure;

Figure 1:
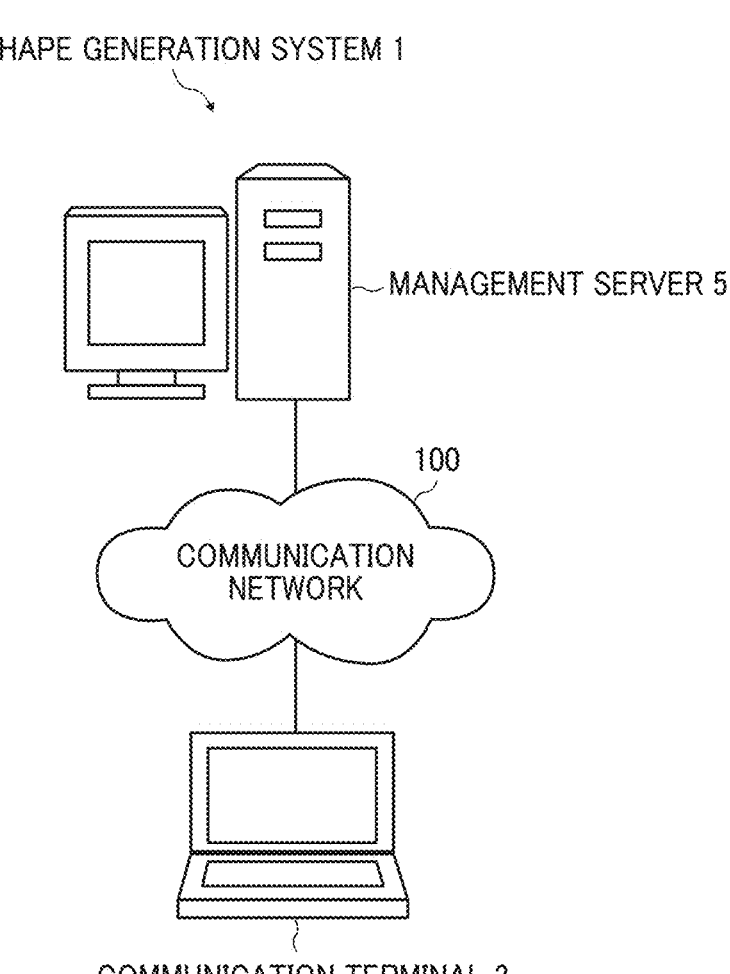
FIG. 1 is a diagram illustrating an overall configuration of a three-dimensional (3D) shape generation system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result falling within the scope of the appended claims).

Referring now to the drawings, embodiments of the present disclosure are described below. As used herein, the singular forms "a," "an," and "the" are intended to include the plural forms as well, unless the context clearly indicates otherwise.

In civil engineering, construction, and other industries, the implementation of building information modeling (BIM)/construction information modeling (CIM) has been promoted for, for example, coping with the demographic shift toward an older population and increasing labor productivity.

BIM relates to the use of a database of buildings, in which attribute data such as cost, finishing details, and management information is added to a three-dimensional (3D) digital model, created on a computer, of a building. The 3D digital model may be referred to as a 3D model in the following description. BIM is a solution for using the information in the database of buildings throughout the process including design of a building, construction work, maintenance, and management.

CIM is a solution that has been proposed for the field of civil engineering (widely covering infrastructure such as roads, electricity, gas, and water supply) following BIM that has been advanced in the field of construction. Similar to BIM, CIM is promoted by aiming at sharing information centered around 3D models among parties concerned to increase the efficiency and sophisticate a series of construction production systems.

For promoting BIM/CIM, what is concerned is how to easily obtain a 3D model of a construction (e.g., a building or a public facility).

In newly building a construction, a complete construction can be modeled from the beginning using 3D computer-aided design (CAD) software. Accordingly, the introduction of BIM/CIM is easier. By contrast, regarding an existing construction, hurdles for promoting BIM/CIM are high. For example, the design drawing may be lost, or a current design may be different from that in the design drawing due to renovation or repair. Such BIM of an existing building is called, for example, "As-Build BIM," and is a challenge for promoting BIM/CIM in the future.

One way to achieve the As-Build BIM is a workflow of generating a CAD model from a point cloud (i.e., data points) obtained by spatial measurement using a laser scanner. In the related art, since a space is reconstructed based on, for example, measuring and sketching using photographs and a measuring tool, the reconstruction involves laborious work. The introduction of laser scanners has significantly increased the efficiency of this work.

In the As-Build BIM using a laser scanner, modeling is facilitated, but work called point cloud processing is added. Typical point cloud processing involves multipoint measurement using a laser scanner, aligning data points (may be referred to as "points" in the following description) to construct a unified point cloud, removing unnecessary points such as noise, and converting the point cloud into a CAD model.

Such a process is executed using an automatic model creation function of commercially available point cloud processing software. However, objects of different categories such as a pipe, a desk, and a person can be present in a space, i.e., a point cloud. If the 3D shapes of objects of different categories are to be generated at once, the accuracy may be insufficient, or the processing time may be long.

By contrast, when the 3D shapes of objects are generated per category, the generation of 3D shapes is repeated for the number of categories, and it takes time and is burdensome.

In view of the above inconvenience, the present embodiment aims to appropriately generate a 3D shape with accuracy desired by a user and reduced time and effort.

FIG. 1 is a diagram illustrating an overall configuration of a 3D shape generation system according to an embodiment of the present disclosure. A 3D shape generation system 1 according to the present embodiment includes a communication terminal 3 and a management server 5.

The management server 5 is an example of a 3D shape generation apparatus that generates 3D shape information indicating a 3D shape corresponding to a 3D point cloud using model shape information indicating a 3D model shape.

A 3D point cloud represents a collection of points defined by coordinates (coordinate points) in a virtual 3D space and can be processed by, for example, a computer. A 3D point cloud may also be referred to as a point cloud. A 3D point cloud is defined as a collection of coordinate points corresponding to measurement points on the surface of an object when a certain space in which the object is present is measured using, for example, a laser scanner. Color information may be added to each of the coordinate points, and the color information may be a red-green-blue (RGB) value of the coordinate point.

In the present embodiment, a laser scanner is used in the measurement for obtaining a 3D point cloud. In some embodiments, another optical measuring means or a mechanical measuring means may be used. Examples of the optical measuring means include a method using a stereo camera and a method using visual simultaneous localization and mapping (SLAM).

3D shape information is information indicating the 3D shape of an object that can be handled by, for example, a computer. The information indicating a 3D shape geometrically specifies the 3D shape. For example, in the case of a sphere, the coordinates of the center and the radius correspond to the information indicating the 3D shape. When the 3D shape of an object is represented by a polyhedron (polygon), a set of coordinate points of the vertices of the polyhedron is an example of the information indicating the 3D shape. Further, the information indicating the 3D shape may be any information that uniquely defines the shape of an object.

The 3D shape information may include information about the color and material of the object in addition to the information indicating the 3D shape of the object.

The 3D model shape refers to a model such as an object model and a template used for generating 3D shape information from a 3D point cloud. The model shape information refers to information indicating a 3D model shape. One piece of model shape information corresponds to one 3D model shape.

The model shape information may include information on the color or material of the 3D model in addition to the 3D model shape. In the case of, for example, a 3D model shape indicating a plane, the model shape information may include information called texture information indicating, for example, the color and the pattern of a wall, and the material of the wall.

The texture information facilitates the reproduction of a 3D object as a colored or patterned CAD model. Further, the material information can be transferred as is to a CAD model to which the material information can be added. Thus, the user's trouble of setting can be eliminated.

"Texture" typically refers to a perceived surface quality or a tactile feel of a surface of an object. "Texture" in 3D shape information refers to a pattern or an image to be attached to the surface of a 3D shape in order to represent the texture of the surface of the object.

Typical methods for generating CAD models include surface, solid, and polygon. Solid modeling uses information on the content such as materials in addition to information on the appearance. This allows the calculation of the mass and volume, and expression of a cross-sectional shape. Thus, solid modeling would be the closest expression of an actual object.

Setting, for example, color, material, brightness, and background on a CAD model is referred to as rendering. Rendering creates a beautiful, photorealistic image.

The communication terminal 3 and the management server 5 communicate via a communication network 100. The communication network 100 is implemented by, for example, the Internet, a mobile communication network, or a local area network (LAN). The communication network 100 may include, in addition to wired communication networks, wireless communication networks in compliance with, for example, 3rd generation (3G), Worldwide Interoperability for Microwave Access (WiMAX), and long term evolution (LTE). Further, the communication terminal 3 can establish communication using a short-range communication technology such as near field communication (NFC).

Hardware Configurations

Figure 2:
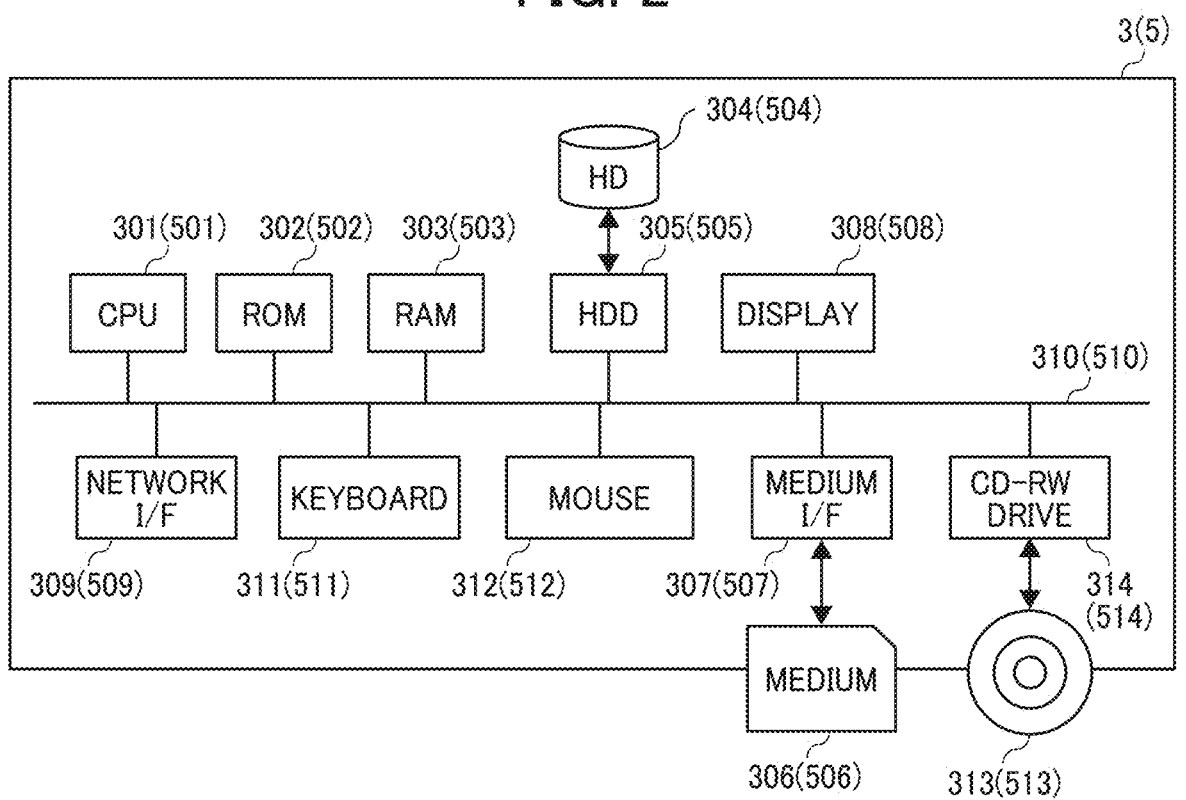
FIG. 2 is a block diagram illustrating a hardware configuration common to a communication terminal and a management server according to an embodiment of the present disclosure.

FIG. 2 is a block diagram illustrating a hardware configuration common to the communication terminal and the management server according to the present embodiment. The hardware components of the communication terminal 3 are denoted by reference numerals in the 300s. The hardware components of the management server 5 are denoted by parenthesized numerals in the 500s.

The communication terminal 3 includes a central processing unit (CPU) 301, a read-only memory (ROM) 302, a random-access memory (RAM) 303, a hard disk (HD) 304, a hard disk drive (HDD) 305, a medium interface (I/F) 307 to which a medium 306 is connected, a display 308, a network I/F 309, a keyboard 311, a mouse 312, a compact disc-rewritable (CD-RW) drive 314, and a bus line 310.

The CPU 301 controls the entire operation of the communication terminal 3. The ROM 302 stores a control program for driving the CPU 301. The RAM 303 is used as a work area for the CPU 301. The HD 304 stores various data such as programs. The HDD 305 controls the reading or writing of various data to or from the HD 304 under the control of the CPU 301. The medium I/F 307 controls the reading or writing (storing) of data from or to the medium 306 (a storage medium) such as a flash memory. The display 308 displays various information such as a cursor, a menu, a window, characters, and images. The network I/F 309 is an interface for data communication via the communication network 100. The keyboard 311 is an input device provided with multiple keys for the user to input, for example, characters, numerals, and various instructions. The mouse 312 is an input device used to, for example, select an instruction, execute various instructions, select a target to be processed, and move a cursor being displayed. The CD-RW drive 314 reads and writes various data from and to a CD-RW 313, which is an example of a removable recording medium.

The management server 5 includes a CPU 501, a ROM 502, a RAM 503, an HD 504, an HDD 505, a medium I/F 507 to which a medium 506 is connected, a display 508, a network I/F 509, a keyboard 511, a mouse 512, a CD-RW drive 514, and a bus line 510. Since these components are similar in configuration to the above-described components (the CPU 301, the ROM 302, the RAM 303, the HD 304, the HDD 305, the medium 306, the medium I/F 307, the display 308, the network I/F 309, the keyboard 311, the mouse 312, the CD-RW drive 314, and the bus line 310). Thus, the description thereof is omitted.

The drive for a removable recording medium is not limited to the CD-RW drives 314 (514) but may be, for example, a compact disc-recordable (CD-R) drive. In one embodiment, each of the communication terminal 3 and the management server 5 is implemented by a single computer. In another embodiment, elements (functions, means, or storage areas) of the communication terminal 3 and the management server 5 are divided and are allocated to multiple computers as desired.

Figure 3:
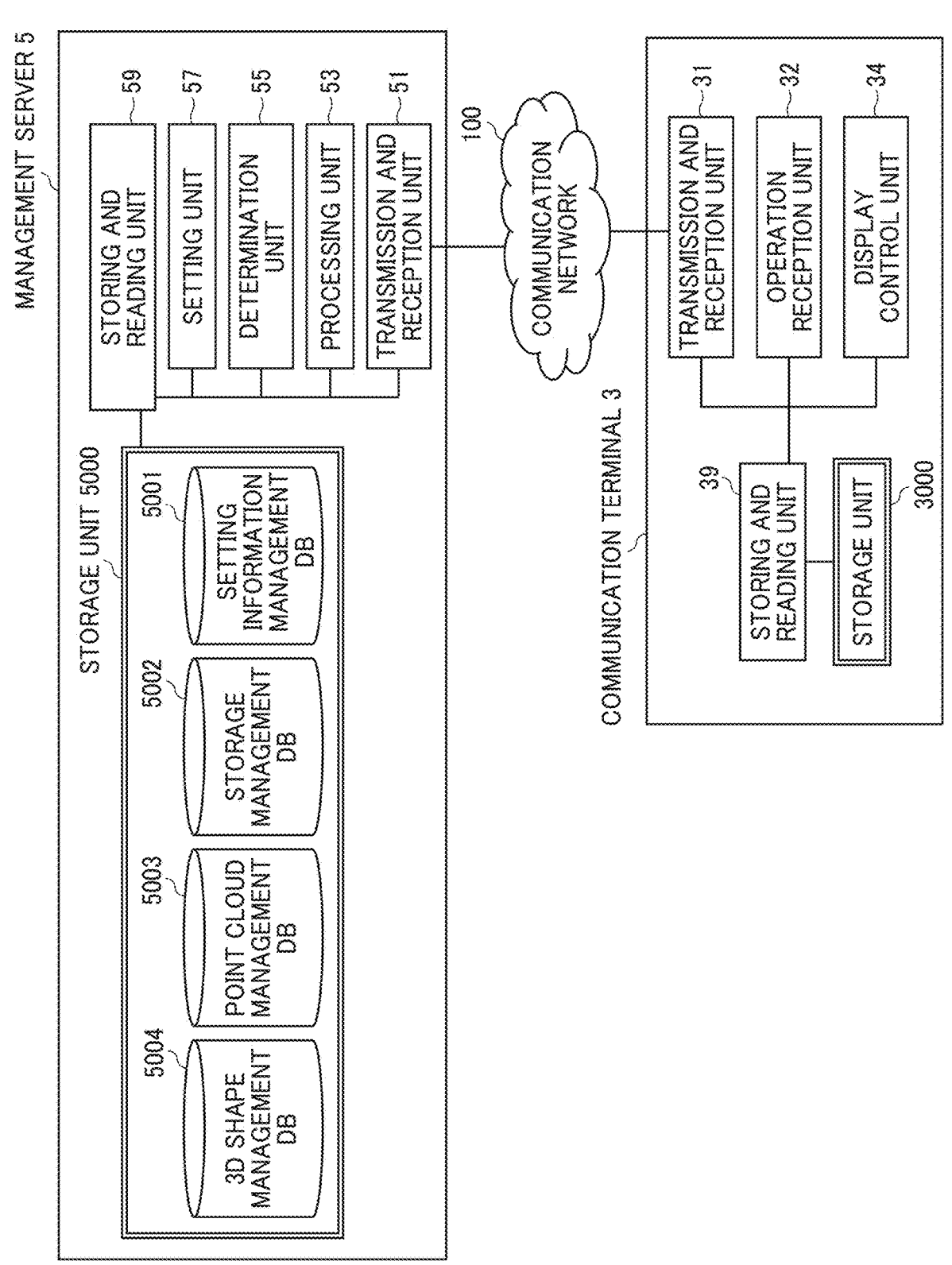
FIG. 3 is a block diagram illustrating a functional configuration of the 3D shape generation system illustrated in FIG. 1.

FIG. 3 is a block diagram illustrating a functional configuration of the 3D shape generation system according to the present embodiment.

As illustrated in FIG. 3, the communication terminal 3 includes a transmission and reception unit 31, an operation reception unit 32, a display control unit 34, and a storing and reading unit 39. These units of functions are implemented by or caused to function by one or more of the components illustrated in FIG. 2 operating according to instructions from the CPU 301 according to the control program loaded from the HD 304 to the RAM 303. The communication terminal 3 further includes a storage unit 3000 implemented by the RAM 303 and the HD 304 illustrated in FIG. 2.

Functional Configuration of Communication Terminal

A description is given below of the functional units of the communication terminal 3.

The transmission and reception unit 31, which is an example of a transmission means and an example of a reception means, is implemented by instructions from the CPU 301 and the network I/F 309 in FIG. 2. The transmission and reception unit 31 transmits or receives various types of data (or information) to or from other communication terminals, devices, apparatuses, or systems through the communication network 100.

The operation reception unit 32 is an example of an operation reception means and implemented by, for example, instructions from the CPU 301, the keyboard 311, and the mouse 312 in FIG. 2. The operation reception unit 32 receives various types of input from the user.

The display control unit 34 is an example of a display control means and implemented by instructions from the CPU 301 in FIG. 2. The display control unit 33 controls the display 308 to display various images and screens (screen images).

The storing and reading unit 39 is an example of a storing control means and is implemented by instructions from the CPU 301 in FIG. 2 and the HDD 305, the medium I/F 307, and the CD-RW drive 314. The storing and reading unit 35 stores various types of data in the storage unit 3000, the medium 306, or the CD-RW 313 and reads the various types of data from the storage unit 3000, the medium 306, or the CD-RW 313.

Functional Configuration of Management Server

The management server 5 includes a transmission and reception unit 51, a processing unit 53, a determination unit 55, a setting unit 57, and a storing and reading unit 59. These are units of functions that are implemented by or caused to function by one or more of the components illustrated in FIG. 2 operating according to instructions from the CPU 501 executing a program loaded from the HD 504 to the RAM 503. The management server 5 further includes a storage unit 5000 implemented by the HD 504 illustrated in FIG. 2. The storage unit 5000 is an example of a storage means.

Functional Configuration of Management Server

A description is given below of the functional units of the management server 5. The management server 5 may be implemented by multiple computers to which the functions thereof are allocated. Although the management server 5 is a server computer that resides in a cloud environment in the following description, alternatively, the management server 5 may be a server that resides in an on-premises environment.

The transmission and reception unit 51 is an example of a transmission means and is implemented by instructions from the CPU 501 and the network I/F 509 illustrated in FIG. 2. The transmission and reception unit 51 transmits and receives various types of data (or information) to and from other terminals, devices, apparatuses, or systems via the communication network 100.

The processing unit 53 is implemented by instructions from the CPU 501 illustrated in FIG. 2 and performs various types of processing described later. The processing unit 53 is an example of a 3D shape generation means that generates 3D shape information.

The determination unit 55 is implemented by instructions from the CPU 501 illustrated in FIG. 2 and performs various determinations described later.

The setting unit 57 is implemented by instructions from the CPU 501 illustrated in FIG. 2 and performs various determinations described later.

The storing and reading unit 59 is an example of a storing control means and implemented by instructions from the CPU 501 and the HDD 505, the medium I/F 507, and the CD-RW drive 514 illustrated in FIG. 2. The storing and reading unit 59 stores various types of data in the storage unit 5000, the medium 506, or the CD-RW 513 and reads the data from the storage unit 5000, the medium 506, or the CD-RW 513. The storage unit 5000, the medium 506, and the CD-RW 513 are examples of the storage means.

The storage unit 5000 includes a setting information management database (DB) 5001 (an example of a setting information management means) in the form of a setting information management table, a storage management DB 5002 (an example of a storage management means), a point-cloud management DB 5003 (an example of a point-cloud management means), and a 3D shape management DB 5004 (an example of a 3D shape management means).

The setting information management DB 5001 stores various types of information. The storage management DB 5002 stores various programs for generating a 3D shape. The point-cloud management DB 5003 stores 3D point cloud information for generating a 3D shape. The 3D shape management DB 5004 stores 3D shape information. For example, the 3D point cloud information includes coordinate information and color information and may be referred to as 3D point-cloud data in the following description.

FIG. 4 is a conceptual diagram illustrating a setting information management table according to the present embodiment.

The setting information management table is for managing 3D point-cloud data used to generate a 3D shape and a history (or a processing history) of processing for generating 3D shapes. The storage unit 5000 stores the setting information management DB 5001 in the form of the setting information management table as illustrated in FIG. 4. In the setting information management table, the file name of 3D point-cloud data and the history of processing for generating 3D shapes are associated with each other for each user ID.

Figure 5:
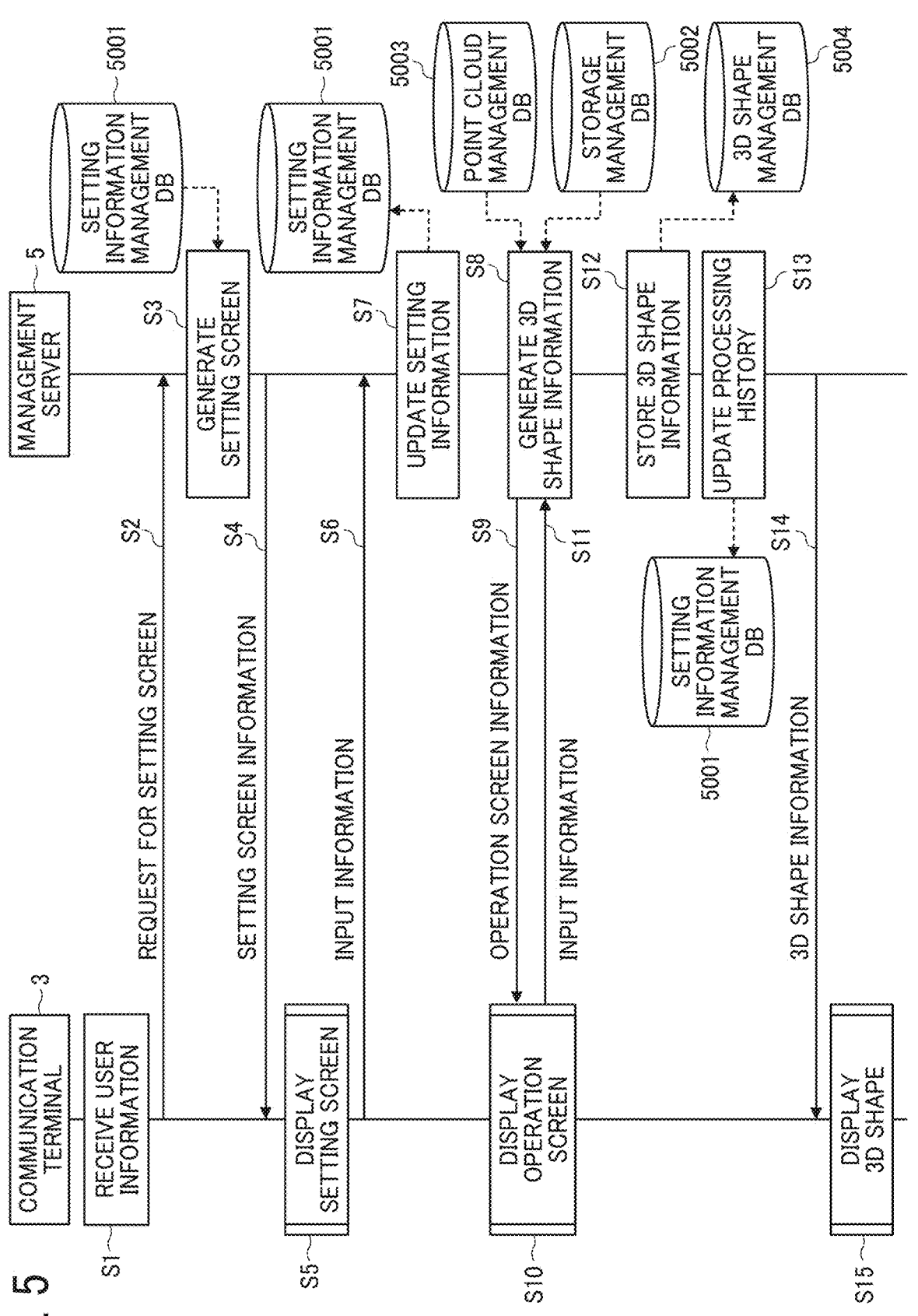
FIG. 5 is a sequence diagram of a 3D shape generation process according to an embodiment of the present disclosure.

FIG. 5 is a sequence diagram of a 3D shape generation process according to the present embodiment.

The operation reception unit 32 of the communication terminal 3 receives an operation for inputting information of the user, on an input/output screen displayed on the display 308 (Step S1). The transmission and reception unit 31 of the communication terminal 3 transmits to the management server 5 a request for generating a setting screen including the user information received in Step S1. The transmission and reception unit 51 of the management server 5 receives the request including the user information from the communication terminal 3 (Step S2).

The storing and reading unit 59 of the management server 5 searches the setting information management DB 5001 using the user information included in the request received in Step S2 as a search key to retrieve the file name of the 3D point-cloud data associated with the user information included in the request and the history of processing for generating 3D shapes. The setting unit 57 of the management server 5 generates a setting screen based on the file name and the history retrieved by the storing and reading unit 59 (Step S3).

The setting screen includes a model information area (model information setting screen), a point-cloud area (point-cloud setting screen), and a processing area (processing setting screen). The model information area receives an operation (model setting operation) for setting two or more model shape information, selected from multiple model shape information, for generating 3D shape information. The point-cloud area receives an operation (point-cloud setting operation) for setting a 3D point cloud used to generate 3D shape information. The processing area receives an operation (processing setting operation) for setting a program used to generate 3D shape information.

In the processing area, an initial setting is displayed based on the history retrieved by the storing and reading unit 59.

The transmission and reception unit 51 transmits to the communication terminal 3 screen information for displaying the setting screen generated in Step S3. The transmission and reception unit 31 of the communication terminal 3 receives the screen information from the management server 5 (Step S4). Step S4 is an example of transmitting screen information for displaying the model information setting screen. The transmission and reception unit 31 is an example of the transmission means.

Subsequently, the display control unit 34 of the communication terminal 3 displays, on the display 308, the setting screen based on the screen information received in Step S4 (Step S5). The operation reception unit 32 of the communication terminal 3 receives an input operation performed by the user on the setting screen displayed. The input operation includes the model setting operation for setting two or more model shape information used for generating 3D shape information, the point-cloud setting operation, and the processing setting operation. Step S5 is an example of receiving the model setting operation for setting two or more model shape information used for generating 3D shape information.

The transmission and reception unit 31 transmits to the management server 5 input information corresponding to the input operation received by the operation reception unit 32. The transmission and reception unit 51 of the management server 5 receives the input information from the communication terminal 3 (Step S6). The input information includes the model setting information indicating the two or more model shape information, the point-cloud setting information, and the processing setting information to be used in generating 3D shape information.

The storing and reading unit 59 of the management server 5 updates the history of processing for generating 3D shapes stored in association with the user information in the setting information management DB 5001, based on the processing setting information and the model setting information included in the input information received in Step S6 (Step S7).

The storing and reading unit 59 of the management server 5 searches the point-cloud management DB 5003 using the point-cloud setting information included in the input information received in Step S6 as a search key to retrieve 3D point-cloud data associated with the point-cloud setting information. The storing and reading unit 59 searches the storage management DB 5002 using the processing setting information included in the input information received in Step S6 as a search key to retrieve the program associated with the processing setting information. The processing unit 53 of the management server 5 generates 3D shape information using the 3D point-cloud data and the program retrieved by the storing and reading unit 59, and the model setting information included in the input information received in Step S6 (Step S8).

Step S8 is an example of generating 3D shape information based on a model setting operation on a model information area 1230 (illustrated in FIG. 6) and the point cloud information indicating a 3D point cloud, using the multiple model shape information set by the model setting operation.

The setting unit 57 of the management server 5 generates an operation screen that receives an input operation for generating the 3D shape information. The transmission and reception unit 51 transmits screen information for displaying the operation screen to the communication terminal 3 (Step S9).

The transmission and reception unit 31 of the communication terminal 3 receives the screen information for displaying the operation screen from the management server 5. The display control unit 34 of the communication terminal 3 displays on the display 308 the operation screen based on the screen information received from the management server 5. The operation reception unit 32 of the communication terminal 3 receives an operation input by the user on the operation screen (Step S10).

The input operation includes an operation (shape setting operation) for setting one 3D shape information selected from multiple 3D shape information.

The transmission and reception unit 31 transmits to the management server 5 input information corresponding to the input operation received by the operation reception unit 32. The transmission and reception unit 51 of the management server 5 receives the input information from the communication terminal 3 (Step S11).

The input information includes shape setting information corresponding to the shape setting operation. The processing unit 53 of the management server 5 determines the 3D shape information based on the shape setting information included in the input information received in Step S11.

The communication terminal 3 and the management server 5 repeat the process from Step S8 to Step S11 as appropriate.

The processing unit 53 converts the generated 3D shape information into, for example, CAD format. The storing and reading unit 59 stores the converted 3D shape information in the 3D shape management DB 5004, the medium 506, or the CD-RW 513 (Step S12). The CAD format is 3D shape information that can be manipulated by 3D CAD software. When the 3D shape information is manipulated with commercially available 3D CAD software, the 3D shape information is converted into the 3D CAD format.

The storing and reading unit 59 updates the history of processing for generating 3D shapes stored in association with the user information in the setting information management DB 5001, based on the model shape information corresponding to the determined 3D shape information (Step S13).

The transmission and reception unit 51 transmits the determined 3D shape information to the communication terminal 3 (Step S14).

The transmission and reception unit 31 of the communication terminal 3 receives the 3D shape information from the management server 5. The display control unit 34 of the communication terminal displays on the display 308 the 3D shape represented by the received 3D shape information (Step S15).

In some embodiments, the functional units of the management server 5 in FIG. 3 are integrated into the communication terminal 3, and the processing performed by the management server 5 described with reference to FIG. 5 is executed by the communication terminal 3.

Figure 6:
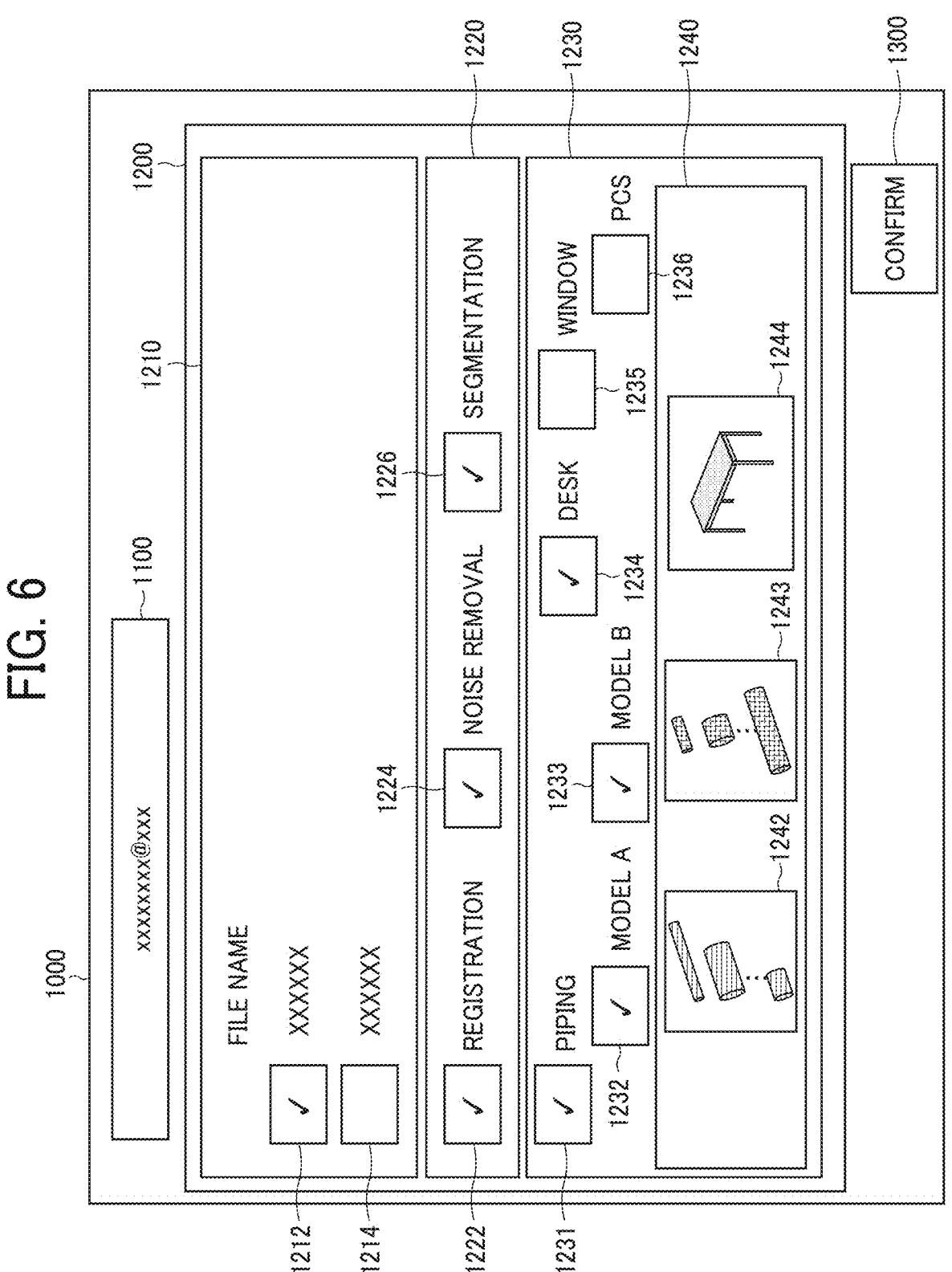
FIG. 6 is a diagram illustrating a setting screen displayed by the 3D shape generation system illustrated in FIG. 3.

FIG. 6 is a diagram illustrating a setting screen displayed by the 3D shape generation system according to the present embodiment.

FIG. 6 illustrates a screen 1000 (a graphical user interface) to be displayed on the display 308 of the communication terminal 3 in Step S5 in the sequence diagram of FIG. 5.

The display control unit 34 of the communication terminal 3 displays a user information section 1100, a setting screen 1200, and a confirmation button 1300 on the screen 1000. The confirmation button 1300 is an example of a display component for receiving an instruction.

The setting screen 1200 includes a point-cloud area 1210, a processing area 1220, and a model information area 1230 (an example of a reception screen).

The point-cloud area 1210 is an area that receives an operation for setting point-cloud information indicating a 3D point cloud used to generate 3D shape information. The display control unit 34 displays point-cloud setting boxes 1212 and 1214 in association with the respective file names of the multiple point-cloud data retrieved by the storing and reading unit 59. Multiple setting boxes (e.g., 1212 and 1214) can be set for point-cloud data.

The processing area 1220 is an area that receives an operation for setting a program used to generate 3D shape information. The display control unit 34 displays processing setting boxes 1222, 1224, and 1226 in association with the names of multiple processing.

In FIG. 6, the processing setting box 1222 is used to set a program for registration. The processing setting box 1224 is used to set a program for noise removal. The processing setting box 1226 is used to set a program for segmentation. Details of these programs will be described later. The processing setting box 1222 for registration may be automatically set when multiple point clouds are set on the point-cloud area 1210. In one embodiment execution of segmentation is not optional, and the processing setting box 1226 for segmentation may be excluded.

The display control unit 34 displays the initial settings of the processing setting boxes 1222, 1224, and 1226 based on the history retrieved by the storing and reading unit 59. If no history is present, a default setting is displayed as an initial setting.

The model information area 1230 is an example of a reception screen that receives the model setting operation for setting multiple model shape information used to generate 3D shape information.

The model information area 1230 includes model information setting boxes 1231, 1234, 1235, and 1236; model candidate setting boxes 1232 and 1233; and a model display segment 1240.

The display control unit 34 displays the model information setting boxes 1231, 1234, and 1235 in association with the names of multiple model information, and displays the model candidate setting boxes 1232 and 1233 in association with the names of multiple model shapes. In the present disclosure, the model information refers to a group including one or more model shape information.

In FIG. 6, the model information setting box 1231 is used to set model information indicating a 3D piping model shape. The model information setting box 1234 is used to set model information indicating a 3D desk model shape. The model information setting box 1235 is used to set model information indicating a 3D model shape of a window. The model information setting box 1236 is used to set a numerical value indicating the number of windowpanes (transparent members) in the 3D model shape of the window set in the model information setting box 1235.

The model candidate setting box 1232 is used to set the model shape information indicating the 3D model shape of a piping model A. The model candidate setting box 1233 is used to set the model shape information indicating the 3D model shape of a piping model B.

The display control unit 34 displays, in the model display segment 1240, model candidates 1242 and 1243 or a model shape 1244 in association with the names of the model information or model candidates. When the model shape information includes color information, the model candidates or model shape displayed may be colored. Each of the multiple model candidates includes 3D model shapes different from each other and is used to generate multiple 3D shape information from the same region in the 3D point cloud. From the generated multiple 3D shape information, one 3D shape information is set in the subsequent process.

The model candidates 1242 represent multiple 3D model shapes of the piping model A. The model candidates 1243 represent multiple 3D model shapes of the piping model B. The model shape 1244 represents the 3D desk model shape.

In response to receiving the pointing of any of the various setting boxes by a pointing device such as the mouse 312 (see FIG. 2), the display control unit 34 displays a tick mark in the selected box. The operation reception unit 32 receives various setting operations and fixes the setting when the confirmation button 1300 is operated. When a numerical value is input to the model information setting box 1236, the operation reception unit 32 receives the input. When the confirmation button 1300 is operated, the operation reception unit 32 fixes the number of windowpanes.

As described in Step S6 of FIG. 5, the transmission and reception unit 31 transmits to the management server 5 input information including the information on the various settings made by various operations received by the operation reception unit 32.

Figure 7:
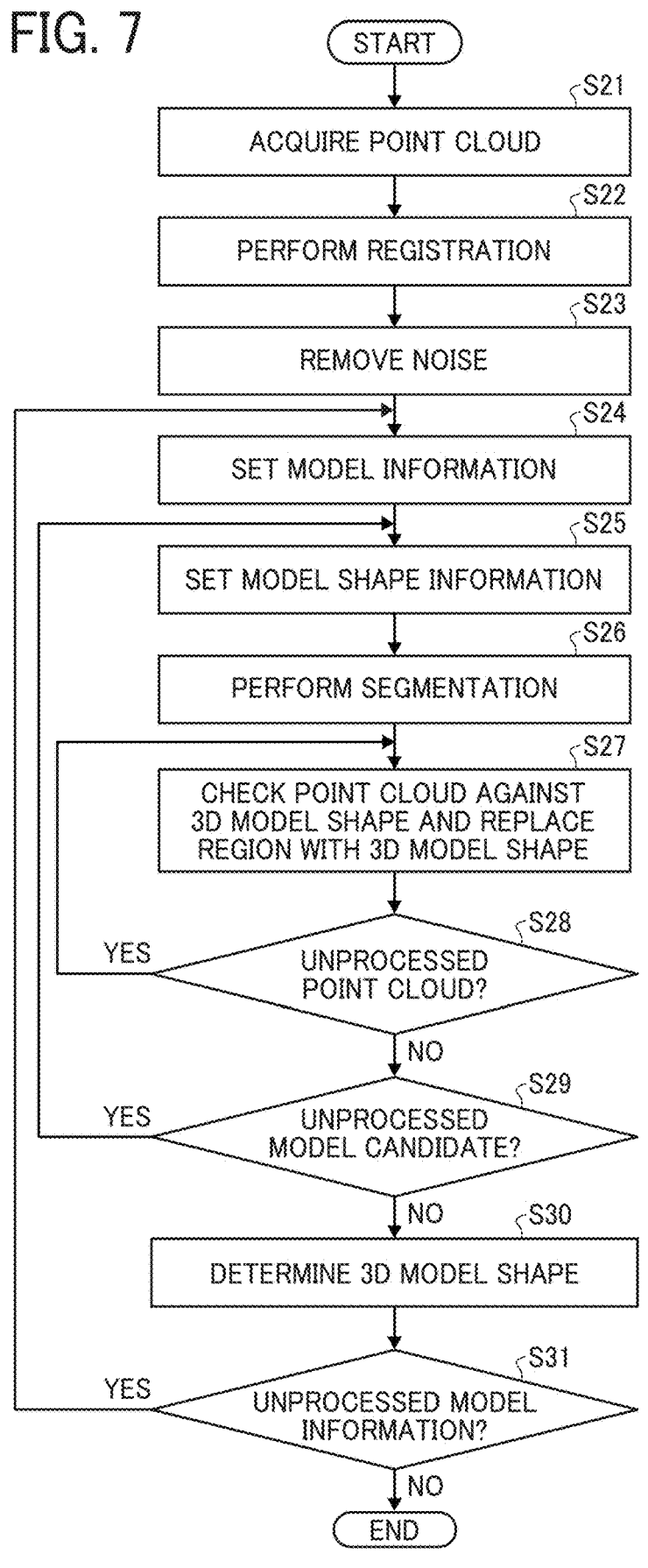
FIG. 7 is a flowchart of an operation in the 3D shape generation process illustrated in FIG. 5.

FIG. 7 is a flowchart of a 3D shape generation process according to the present embodiment. FIG. 7 illustrates the operation corresponding to Steps S8 in FIG. 5.

The processing unit 53 of the management server 5 acquires the 3D point-cloud data retrieved by the storing and reading unit 59 (Step S21). When multiple sets of 3D point-cloud data are acquired and the program retrieved by the storing and reading unit 59 includes a program for registration, the processing unit 53 performs registration (Step S22). The registration is processing for transforming multiple 3D point clouds into one unified 3D point cloud.

When the program retrieved by the storing and reading unit 59 includes a program for noise removal, the processing unit 53 performs noise removal (Step S23). Noise removal is the processing for removing unnecessary points from the 3D point clouds.

The setting unit 57 of the management server 5 sets model information based on the model setting information included in the input information received in Step S6 of FIG. 5 (Step S24). When the model setting information includes, for example, the model information indicating a 3D piping model shape and the model information indicating a 3D desk model shape as illustrated in FIG. 6, the setting unit 57 first sets the model information indicating the 3D piping model shape.

The setting unit 57 sets one or multiple model shape information based on the model setting information included in the input information received in Step S6 of FIG. 5 (Step S25). When the model setting information includes, for example, the model shape information indicating the 3D model shape of the piping model A and the model shape information indicating the 3D model shape of the piping model B as illustrated in FIG. 6, the setting unit 57 first sets the model shape information indicating the 3D model shape of the piping model A.

When the programs retrieved by the storing and reading unit 59 include a program for segmentation, the processing unit 53 performs segmentation (step S26).

The segmentation is also called a point cloud classification, and, for example, Han Xian-Feng, Yu-Jia Kuang, and Guo-Qiang Xiao, "Point Cloud Learning with Transformer," 2021, arXiv:2104.13636, is known.

Segmentation is the processing for labeling a specific point cloud to be distinguished from other clouds in a 3D point cloud. Different labels may be assigned to the specific point clouds to mutually distinguish the points from one another. The segmentation may be performed in addition to clustering for grouping close point clouds of the labeled point clouds.

The segmentation achieves the classification of, for example, a window-related object such as a window frame in order to identify the position of a window. In this case, to achieve the classification, the point clouds of a window frame are labeled and a learned model to output the point clouds of window frame category is generated. The window-related object is not limited to window frames but may be any object such as a handle of a glass door that is likely to be on the window.

The processing unit 53 checks the point cloud labeled in Step S26 against the multiple 3D model shapes included in the model shape information set in Step S25 and replaces (transforms) a specific region using a closest 3D model shape (Step S27). When the multiple 3D model shapes do not include an optimum model shape, the processing unit 53 may adjust the size and shape of the model shape. When there may be a model shape that is similar in shape but is different in texture information, such models similar in shape and different in texture information may be included in the collating. Further, the processing unit 53 may skip the segmentation in Step S26 and perform Step S27 after Step S25.

The determination unit 55 of the management server 5 determines whether there is any unprocessed point cloud not yet replaced (Step S28). When there is an unprocessed point cloud, the process returns to Step S27, and the processing unit 53 replaces a specific area of the unprocessed point cloud using a 3D model shape. When the ratio of unprocessed point clouds to all the point clouds is equal to or below a threshold value, the determination unit 55 may determine that no unprocessed point cloud is present, i.e., the process on the point clouds is completed.

When the determination unit 55 determines that no unprocessed point cloud is present, the determination unit 55 determines whether there are unprocessed model candidates (Step S29). When the determination unit 55 determines that unprocessed model candidates are present, the process returns to Step S25. In Step S25, the setting unit 57 sets model shape information included in the unprocessed model candidates. For example, when the multiple model candidates are the piping models A and B, the setting unit 57 sets the model shape information indicating the 3D model shape of the piping model B after setting the model shape information indicating the 3D model shape of the piping model A.

When the determination unit 55 determines that no unprocessed model candidates are present, the processing unit 53 determines the 3D shape information based on the shape setting information included in the input information received in Step S11 of FIG. 5 (Step S30). For example, when the multiple model candidates are the piping models A and B, the setting unit 57 determines, as the 3D shape information, one of the 3D shape information generated based on the model shape information of the piping model A and the 3D shape information generated based on the model shape information of the piping model B.

The determination unit 55 determines whether there is any unprocessed model information (Step S31). When no unprocessed model information is present, the process ends.

When the determination unit 55 determines that unprocessed model information is present, the process returns to Step S24. In Step S24, the setting unit 57 sets the unprocessed model shape information. For example, the setting unit 57 sets the desk model information after setting the piping model information.

Figure 8A:
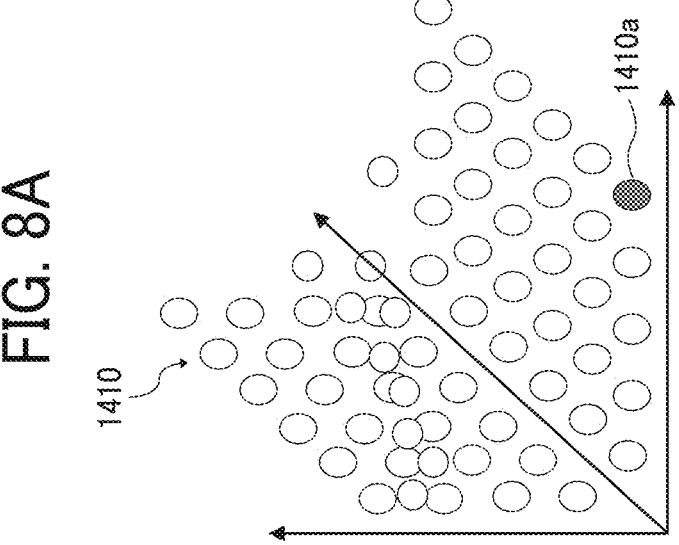
FIGS. 8A and 8B are diagrams each illustrating registration according to an embodiment of the present disclosure.
Figure 8B:
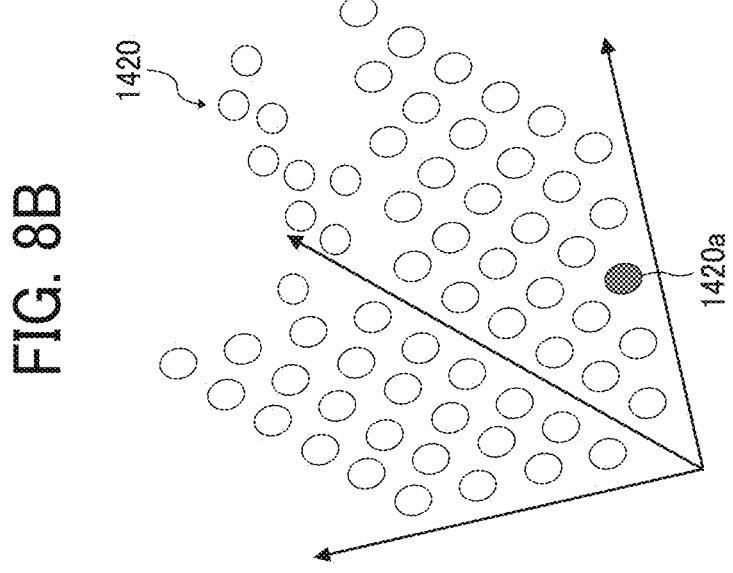

FIGS. 8A and 8B are diagrams each illustrating registration according to the present embodiment.

FIG. 8A illustrates a first 3D point cloud 1410, and FIG. 8B illustrates a second 3D point cloud 1420.

The processing unit 53 transforms the first 3D point cloud 1410 and the second 3D point cloud 1420 into one integrated 3D point cloud by aligning a feature point 1410a in the first 3D point cloud 1410 and a feature point 1420a in the second 3D point cloud 1420.

Figure 9:
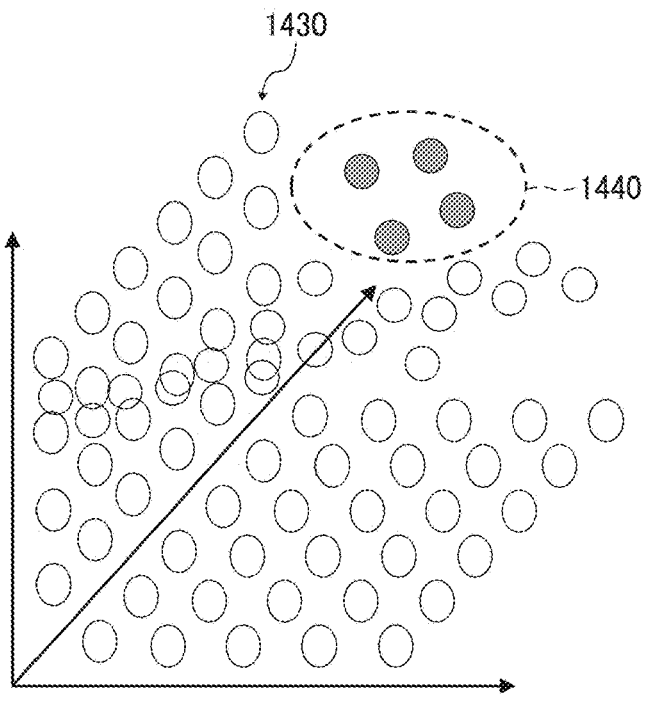
FIG. 9 is a diagram illustrating noise removal according to an embodiment of the present disclosure.

FIG. 9 is a diagram illustrating noise removal according to the present embodiment. The processing unit 53 removes an unnecessary point cloud 1440 from a 3D point cloud 1430.

Figure 10:
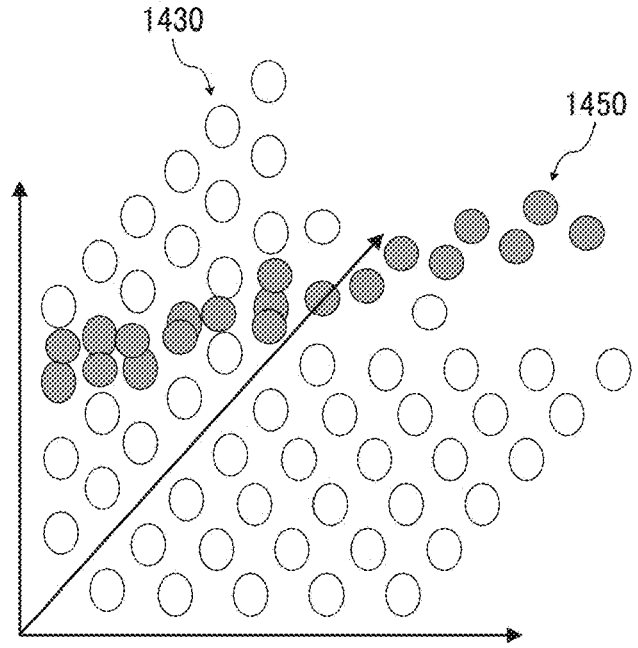
FIG. 10 is a diagram illustrating segmentation according to an embodiment of the present disclosure.

FIG. 10 is a diagram illustrating segmentation according to the present embodiment.

The processing unit 53 labels a specific point cloud in the 3D point cloud 1430 to form a labeled point cloud 1450 (black points in FIG. 10) distinguishable from the other point clouds.

Figures 11A, 11B, 11C:
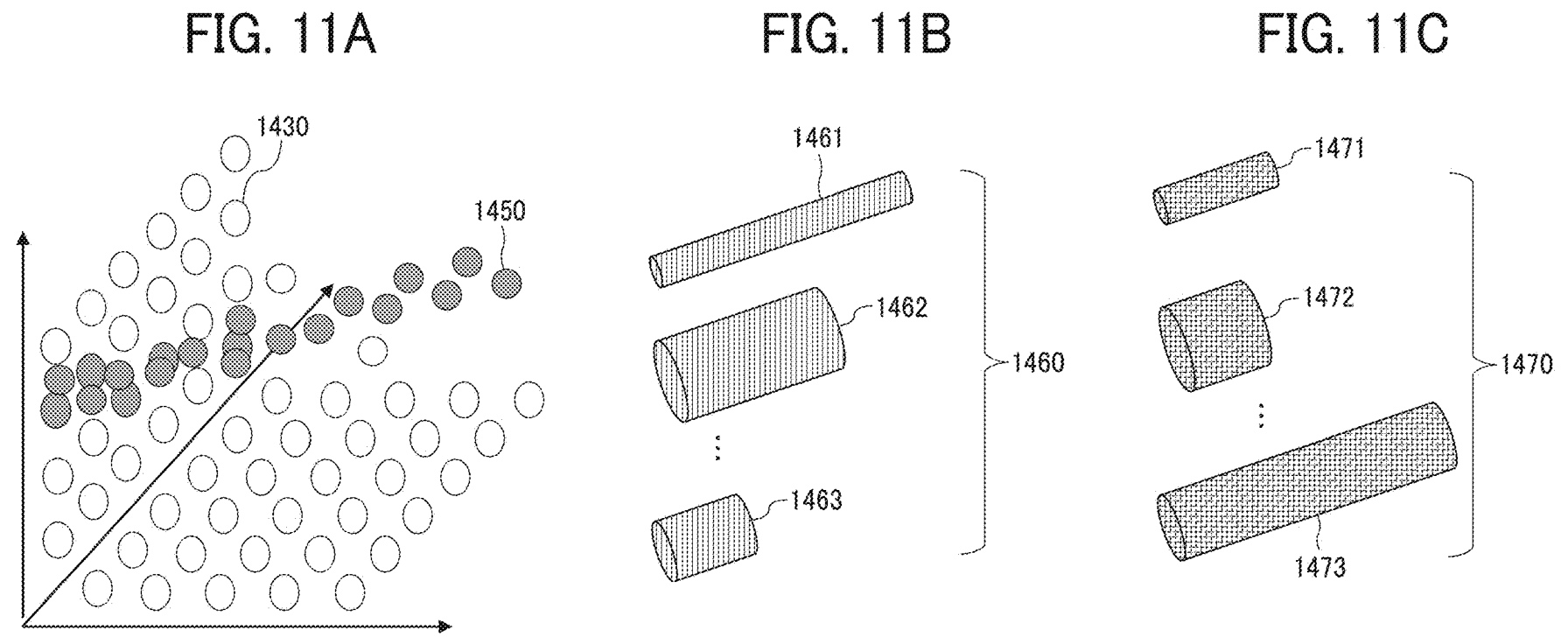

FIGS. 11A to 11C are diagrams each illustrating model checking and transformation according to the present embodiment.

FIG. 11A illustrates the 3D point clouds 1430. FIG. 11B illustrates model candidates 1460 of the piping model A. FIG. 11C illustrates model candidates 1470 of the piping model B.

The model candidates 1460 of the piping model A includes multiple model shapes 1461, 1462, and 1463 different from one another. The model candidate 1470 of the piping model B includes multiple model shapes 1471, 1472, and 1473 different from one another.

The processing unit 53 checks the labeled point cloud 1450 (black points) against the multiple model shapes 1461, 1462, and 1463 of the piping model A, and replaces the specific region using the model shape having the closest shape. When there is no optimum model shape among the multiple model shapes 1461, 1462, and 1463, the processing unit 53 may adjust the size and shape of the model shape. In the present embodiment, for example, the distance between the model shape and each point of the point cloud is calculated, and the model shape having the smallest sum of the distances is determined as the model shape having the closest shape.

When there may be a model shape that is similar in shape but is different in texture or material, multiple textures and multiple materials may be checked. For example, the colors (RGB) of the point clouds are compared with the colors of the texture included in the model shape information to determine the closest color. Specifically, for example, the difference in color between each point of the point cloud and the portion of the model shape closest to the point is obtained by any method. The color of the point is represented by an RGB value, and the color of the model shape is indicated by the color information (RGB) in the texture of the model shape. The closest color is determined based on the sum of absolute values of the differences in color.

The processing unit 53 checks the labeled point cloud 1450 (black points) against the multiple model shapes 1471, 1472, and 1473 of the piping model B, and replaces the specific region using the model shape having the closest shape. When the multiple 3D model shapes do not include an optimum model shape, the processing unit 53 may adjust the size and shape of the model shape. When there is no optimum model shape among the multiple model shapes 1471, 1472, and 1473, the processing unit 53 may adjust the size and shape of the model shape.

Figure 12:
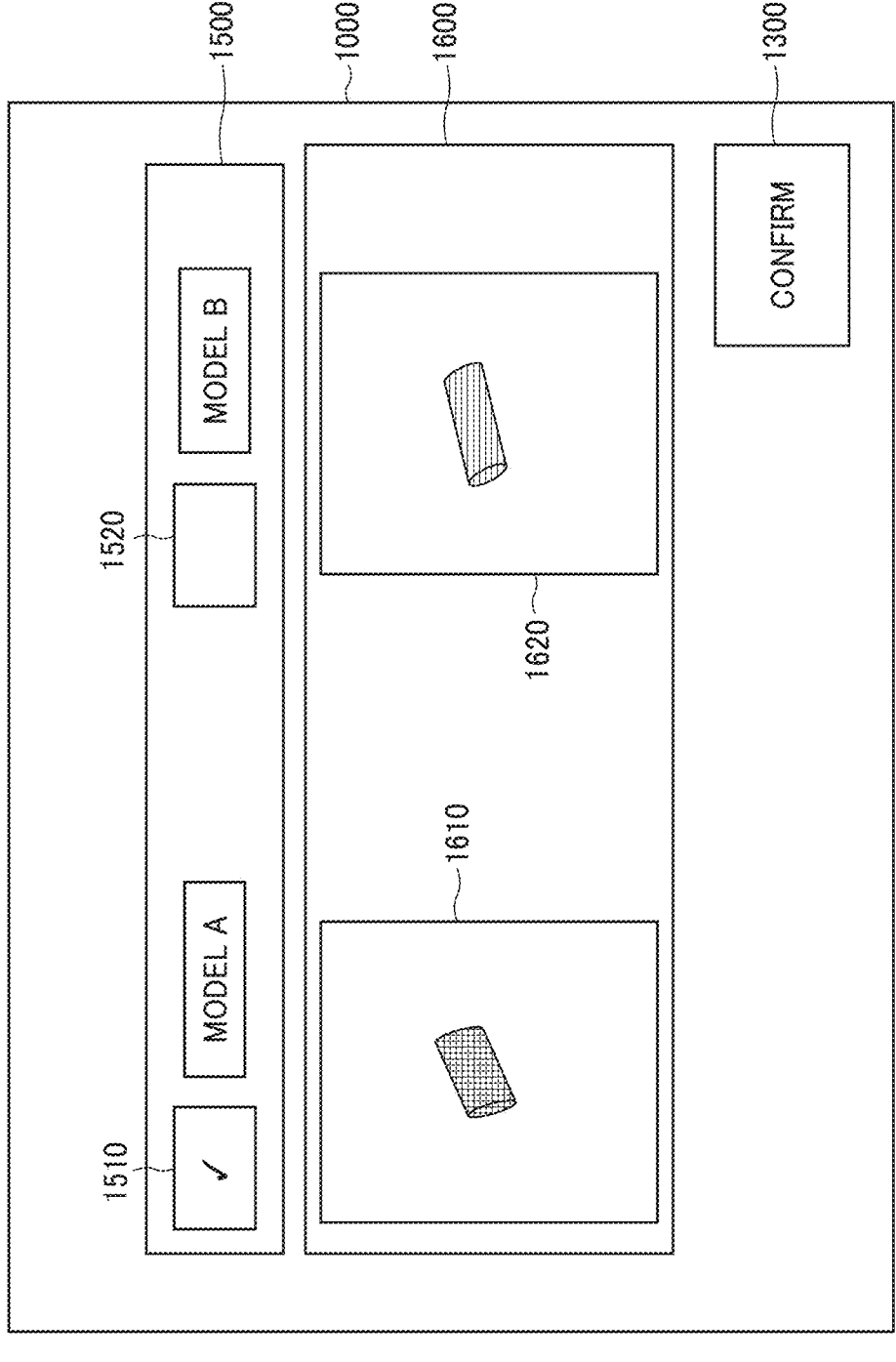
FIG. 12 is a diagram illustrating an operation screen displayed by the 3D shape generation system illustrated in FIG. 3.

FIG. 12 is a diagram illustrating an operation screen according to the present embodiment.

FIG. 12 illustrates the screen 1000 displayed on the display 308 of the communication terminal 3 in Step S10 of the sequence diagram in FIG. 5.

The display control unit 34 of the communication terminal 3 displays a generated shape setting area 1500, a generated shape display area 1600, and the confirmation button 1300 on the screen 1000.

The generated shape setting area 1500 is an example of a second reception screen that receives an operation for setting one 3D shape information from multiple 3D shape information. The generated shape setting area 1500 includes setting boxes 1510 and 1520.

The setting box 1510 is used to set a 3D shape generated based on the model shape information of the piping model A. The setting box 1520 is used to set a 3D shape generated based on the model shape information of the piping model B.

The display control unit 34 displays in the generated shape display area 1600 generated shapes 1610 and 1620 in association with the respective names of the multiple model shape information.

The generated shape 1610 is a 3D shape generated based on the model shape information of the piping model A. The generated shape 1620 is a 3D shape generated based on the model shape information of the piping model B.

When the setting box 1510 or 1520 is selected with a pointing device such as the mouse 312 (i.e., a user's operation), the operation reception unit 32 of the communication terminal 3 receives a shape setting operation for setting the shape. When the confirmation button 1300 is operated, the operation reception unit 32 fixes the shape set by the operation.

As described in Step S11 of FIG. 5, the transmission and reception unit 31 transmits to the management server 5 input information including shape setting information received based on the shape setting operation received by the operation reception unit 32. In FIG. 12, one of the generated shape 1610 and the generated shape 1620 is selected based on the user's operation. In another embodiment, the processing unit 53 of the management server 5 automatically selects the closer of the generated shapes 1610 and 1620 to the shape of the labeled point cloud irrespective of a user's operation. In the present disclosure, the processing unit 53 calculates the distance between each point in the point cloud and the generated shape and determines the generated shape having the smaller sum of distance as the closer to the shape of the labeled point cloud.

Figure 13A:
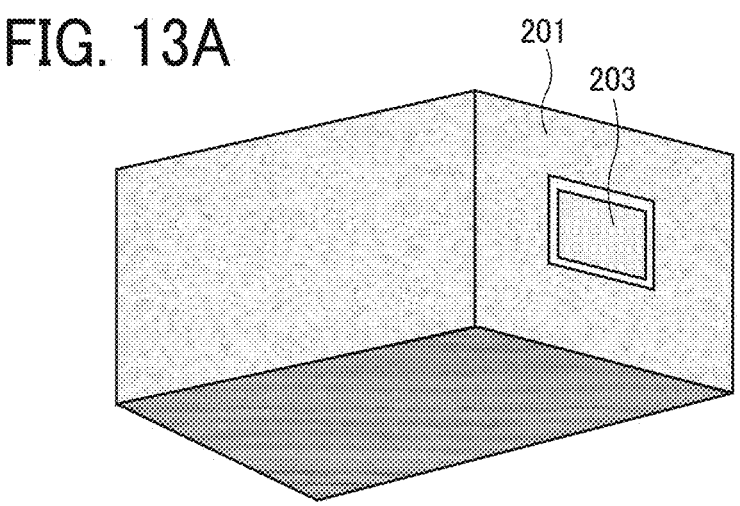
FIGS. 13A to 13C are diagrams each illustrating a transparent member according to an embodiment of the present disclosure.
Figure 13B:
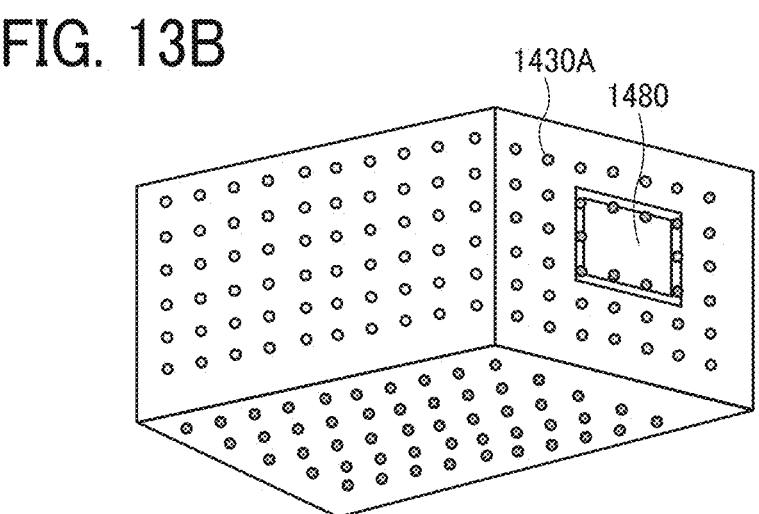
Figure 13C:
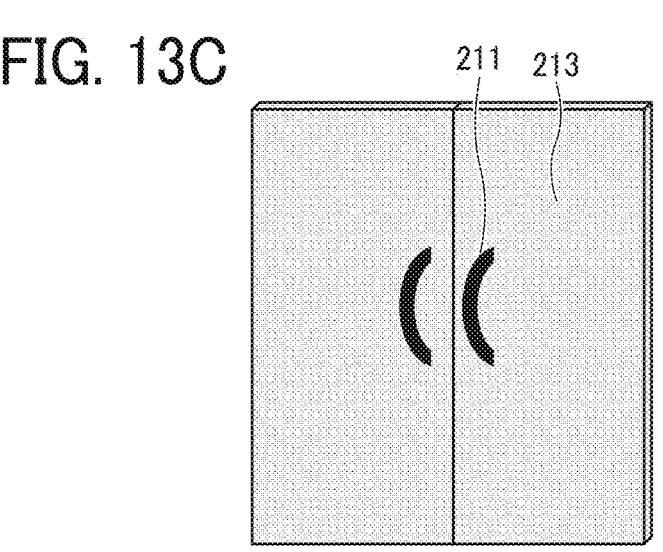

FIGS. 13A to 13C are diagrams each illustrating a transparent member according to the present embodiment.

FIG. 13A illustrates a real object, and FIG. 13B illustrates 3D point clouds obtained by measuring the object illustrated in FIG. 13B.

The object illustrated in FIG. 13A has a window 203 (an example of a transparent member) occupying a portion of a wall face 201. As illustrated in FIG. 13B, a point cloud 1430A can be acquired in a region corresponding to the wall face 201. By contrast, a region 1480 corresponding to the window 203 has low reflectance and transmits the light for distance measuring. Accordingly, an appropriate point cloud cannot be acquired in the region 1480 because, for example, no point cloud is acquired, the number of points are too small, or a point cloud of an object beyond the window 203 is acquired.

Accordingly, the model checking and transformation described with reference to FIGS. 11A to 11C can be executed for the region corresponding to the wall face 201 based on the point cloud 1430A but cannot be executed for the region 1480 corresponding to the window 203.

FIG. 13C illustrates a transparent door 213 as another example of the real object of the transparent member. The transparent door 213 is provided with handles 211.

In the case of the object in FIG. 13C, the model checking and transformation described with reference to FIGS. 11A to 11C can be executed for the region corresponding to the handles 211 based on the point cloud 1430 but cannot be executed for the region corresponding to the transparent door 213.

An object of the present embodiment is to add 3D shape information of a transparent member, such as the window 203 or the transparent door 213, having a low reflectance that makes it difficult to acquire a point cloud.

Figure 14:
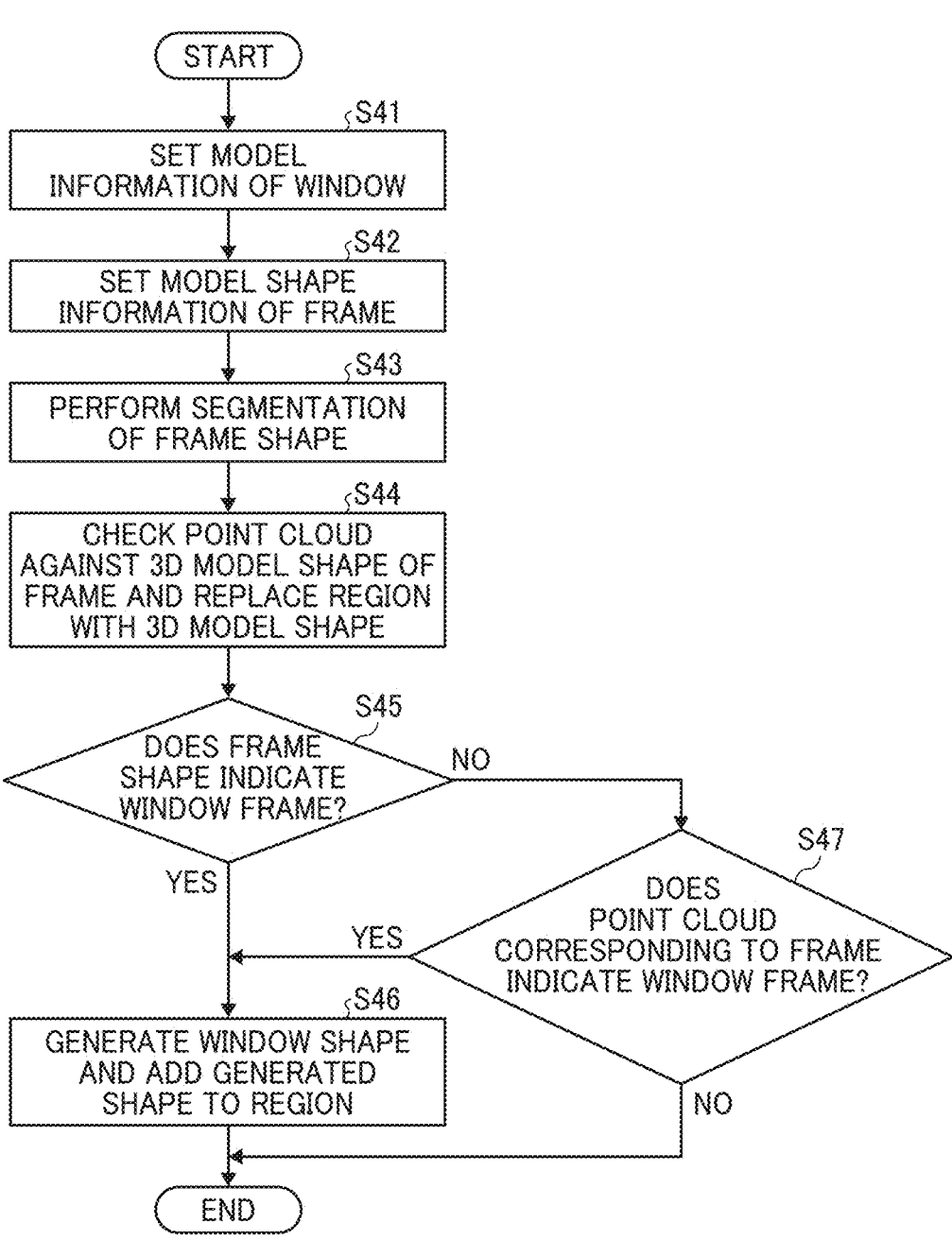
FIG. 14 is a flowchart of a 3D shape generation process of a frame and a transparent member according to an embodiment of the present disclosure.

FIG. 14 is a flowchart of a 3D shape generation process for a frame and a transparent member according to the present embodiment. FIG. 14 illustrates the operation corresponding to Steps S24 to S27 in FIG. 7.

The setting unit 57 of the management server 5 sets model information of the window based on the model setting information of the window and the number of windows included in the input information received in Step S6 of FIG. 5 (Step S41) and sets model information of a frame (Step S42).

The processing unit 53 performs the segmentation of the frame shape (Step S43). The processing unit 53 checks the point cloud labeled in Step S26 against the multiple 3D model shapes included in the model shape information of the frame set in Step S42 and replaces (transforms) a specific region using a closest 3D model shape to generate 3D shape information of the frame (Step S44).

Step S44 is pre-processing for identifying the position of the window. The region surrounded by the 3D shape information of the frame generated in Step S44 is used as a candidate for the area where a window is present.

When the 3D shape information of the frame generated by the replacement in Step S44 indicates a window frame, the determination unit 55 determines that the frame is a window frame (Step S45). The processing unit 53 generates 3D shape information of the window using the model shape information of the window including the number of windows, and adds the 3D shape information to the region surrounded by the frame generated in Step S44 (Step S46).

When the frame is not determined to be a window frame in Step S45, the determination unit 55 further determines whether the point cloud corresponding to the 3D shape information of the frame generated by the replacement in Step S44 indicates a window frame, and, when the corresponding point cloud indicates a window frame, the determination unit 55 determines that the frame is a window frame (Step S45). The processing unit 53 generates 3D shape information of the window using the model shape information of the window including the number of windows, and adds the 3D shape information to the region surrounded by the frame generated in Step S44 (Step S46).

When the frame is not be determined to be a window frame in Step S47, the 3D shape information of the frame generated in Step S44 is determined to surround an opening without a window. In this case, the processing unit 53 does not generate and add the 3D shape information of the window using the model shape information of the window.

FIGS. 15A to 15D are diagrams each illustrating 3D shape information of a frame and a transparent member according to the present embodiment, and corresponds to the process of steps S44 to S46 in FIG. 14.

Figures 15A, 15B, 15C, 15D:
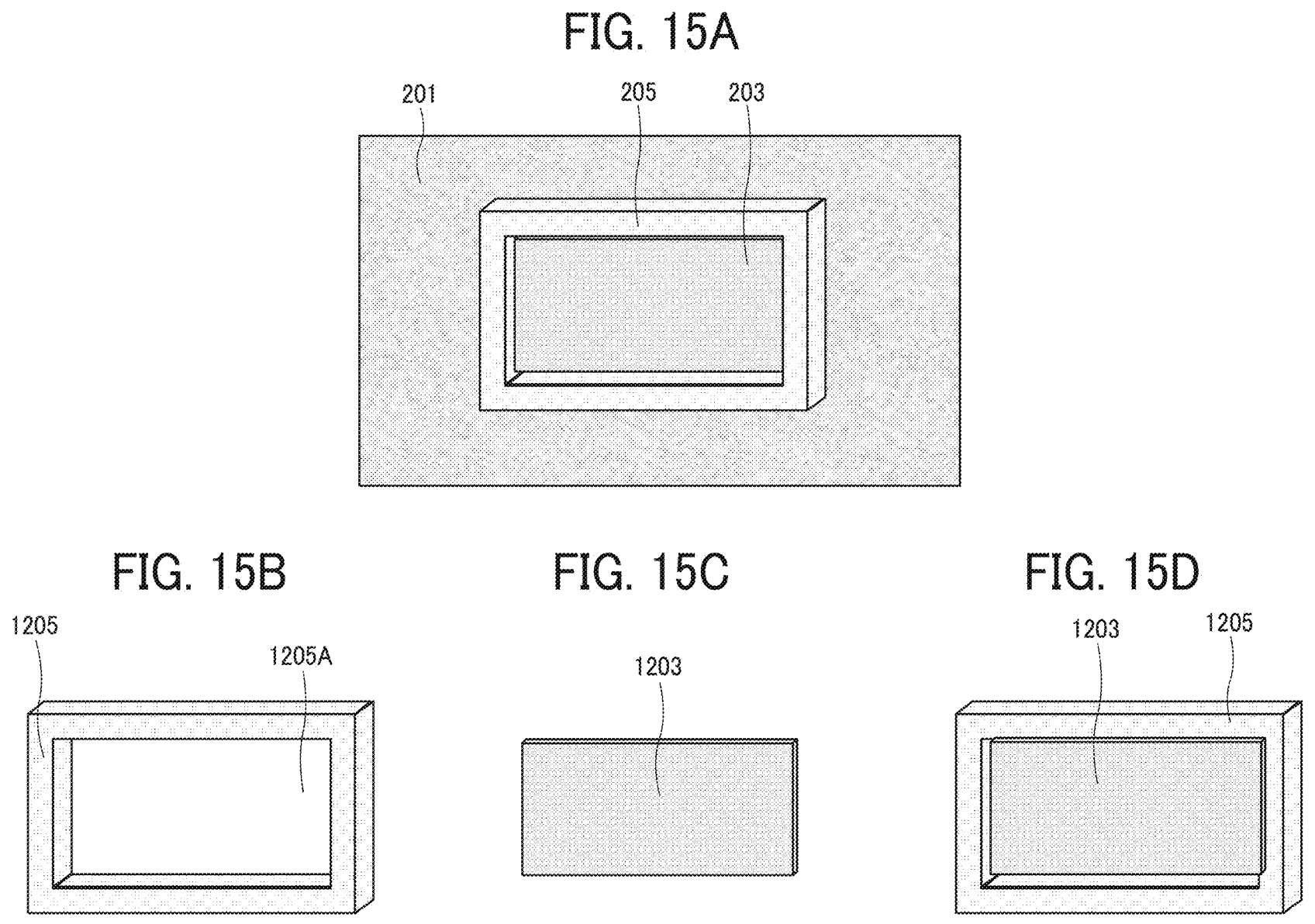

FIG. 15A illustrates a real object that is similar to the real object in FIG. 13A and has the window 203 that occupies a portion of the wall face 201 and is surrounded by a window frame 205. In the present embodiment, processing focusing on the window frame 205 is executed.

As illustrated in FIG. 15B, the processing unit 53 generates 3D shape information 1205 of the frame using model shape information of the frame based on the labeled point cloud corresponding to the frame 205. As a result, a region 1205A surrounded by the 3D shape information 1205 of the frame is usable as a candidate for the area where a window is present.

Subsequently, when the determination unit 55 determines that the 3D shape information 1205 of the frame indicates a shape typical of window frames, the processing unit 53 generates 3D shape information 1203 of a window based on the size of the region 1205A surrounded by the 3D shape information 1205 of the frame as illustrated in FIG. 15C.

Specifically, the determination unit 55 determines that the shape typical of window frames is indicated based on, for example, the thickness of the portion of the frame protruding from the wall face being equal to or greater than a threshold value or a decoration typical of window frames.

Subsequently, as illustrated in FIG. 15D, the processing unit 53 adds the 3D shape information 1203 of the window to the region 1205A surrounded by the 3D shape information 1205 of the frame.

Figure 16A:
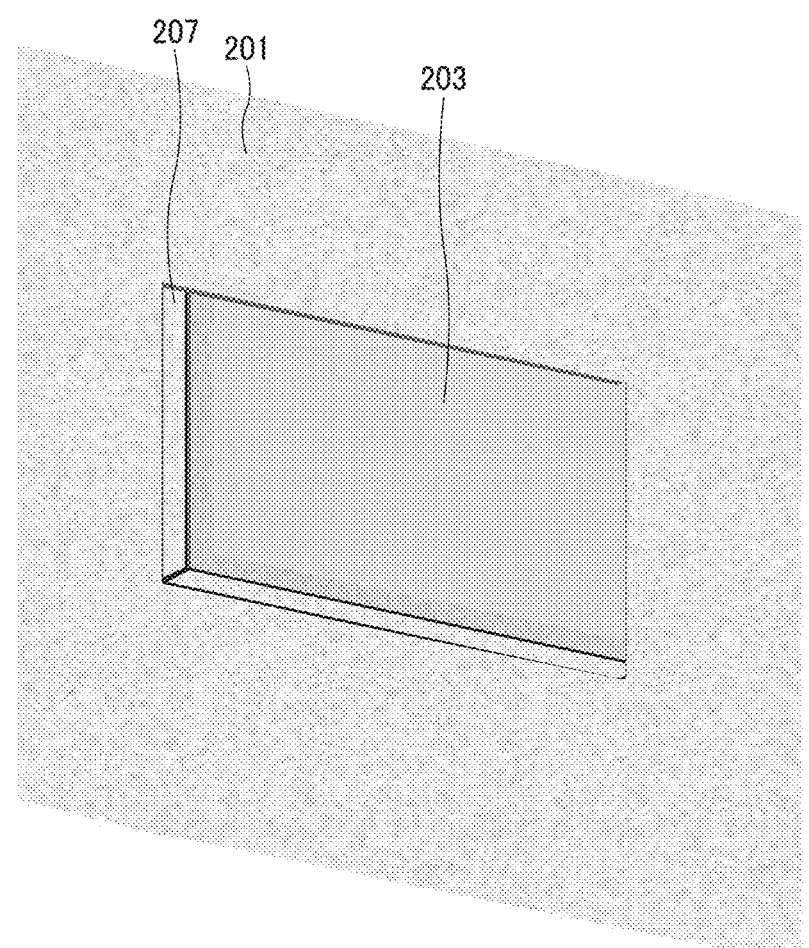
FIGS. 16A and 16B are diagrams each illustrating a point cloud corresponding to a frame according to an embodiment of the present disclosure.
Figure 16B:
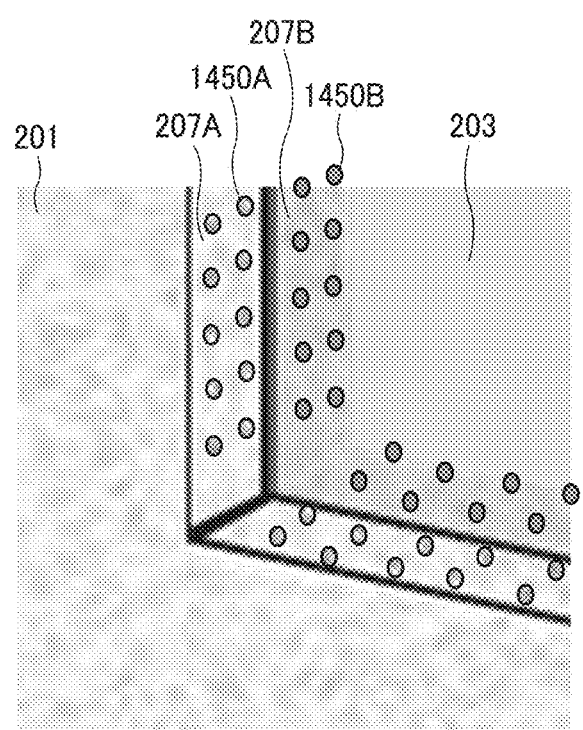

FIGS. 16A and 16B are diagrams each illustrating a point cloud corresponding to a frame according to the present embodiment.

FIG. 16A illustrates a real object having the window 203 that occupies a portion of the wall face 201 and is surrounded by a frame 207. The frame 207 is recessed from the wall face 201, which is not a shape typical of window frames like the frame 205 in FIG. 15. Accordingly, the determination unit 55 does determine that the frame 207 is a window frame in Step S45 in FIG. 14.

As illustrated in FIG. 16B, the frame 207 of the window 203 includes a front portion 207A closer than the window and a rear portion 207B farther than the window. By measuring these portions and performing the segmentation, a labeled front point cloud 1450A and a labeled rear point cloud 1450B are obtained.

The front portion 207A and the rear portion 207B of the frame 207 are examples of a first frame and a second frame, respectively. The labeled front point cloud 1450A and the labeled rear point cloud 1450B are examples of a first point cloud labeled as the first frame and a second point cloud labeled as the second frame.

In Step S46 of FIG. 14, the determination unit 55 can determine whether the front point cloud 1450A and the rear point cloud 1450B are point clouds indicating a window frame, as will be described in detail below with reference to the subsequent drawings.

Figures 17A, 17B:
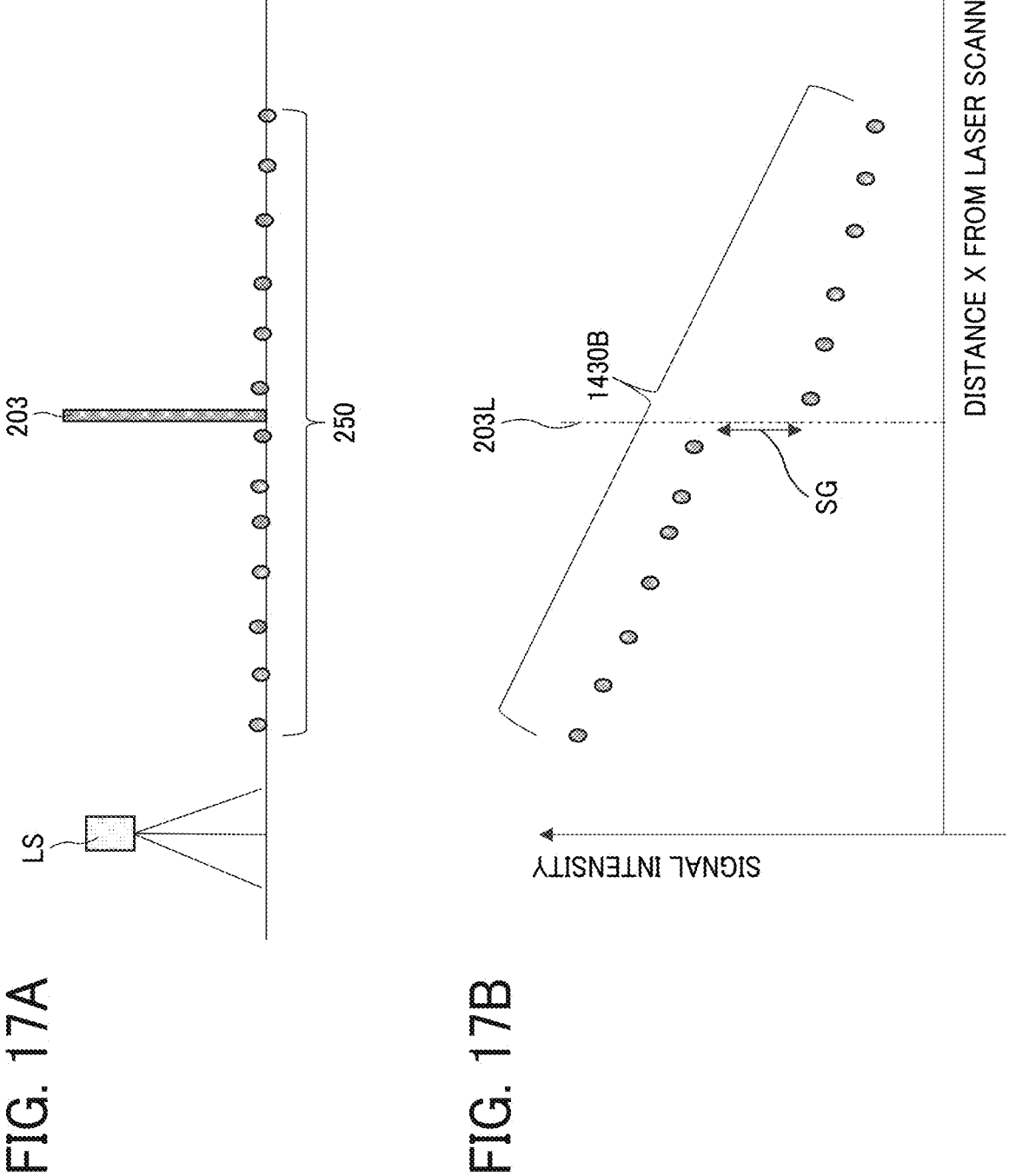
FIGS. 17A and 17B are diagrams each illustrating the signal intensity of a point cloud corresponding to a frame according to an embodiment of the present disclosure.

FIGS. 17A and 17B are diagrams each illustrating the signal intensity of a point cloud corresponding to a frame according to the present embodiment.

FIG. 17A is a diagram illustrating the relative positions of a laser scanner LS, multiple measurement points 250, and the window 203.

In the present embodiment, 3D point-cloud data including coordinate information and information on the signal intensity at each coordinate point is acquired using the laser scanner LS that acquires signal intensity. Signal intensity is determined by, for example, the distance from the measurement position, and the reflective property of the object. For example, when the distance from the laser scanner to the object increases, the signal intensity decreases.

FIG. 17B illustrates the relation between the distance from the laser scanner LS and the signal intensity in a point cloud 1430B acquired by measuring the multiple measurement points 250 with the laser scanner LS.

The intensity of the returned signal varies depending on the case of reflection and the color of the surface. The case of reflection is determined by, for example, the material of the surface and fine irregularities on the surface. The light beam of the laser scanner LS typically has a characteristic that the signal intensity is attenuated when the light beam passes through a transparent member such as glass. Since the light beam passes through the glass and returns through the glass, this attenuation occurs twice. Accordingly, a gap SG is caused in the signal intensity before and after the signal passes through the glass surface. The presence of a window and a window position 203L can be determined by using the gap SG.

Figures 18A, 18B:
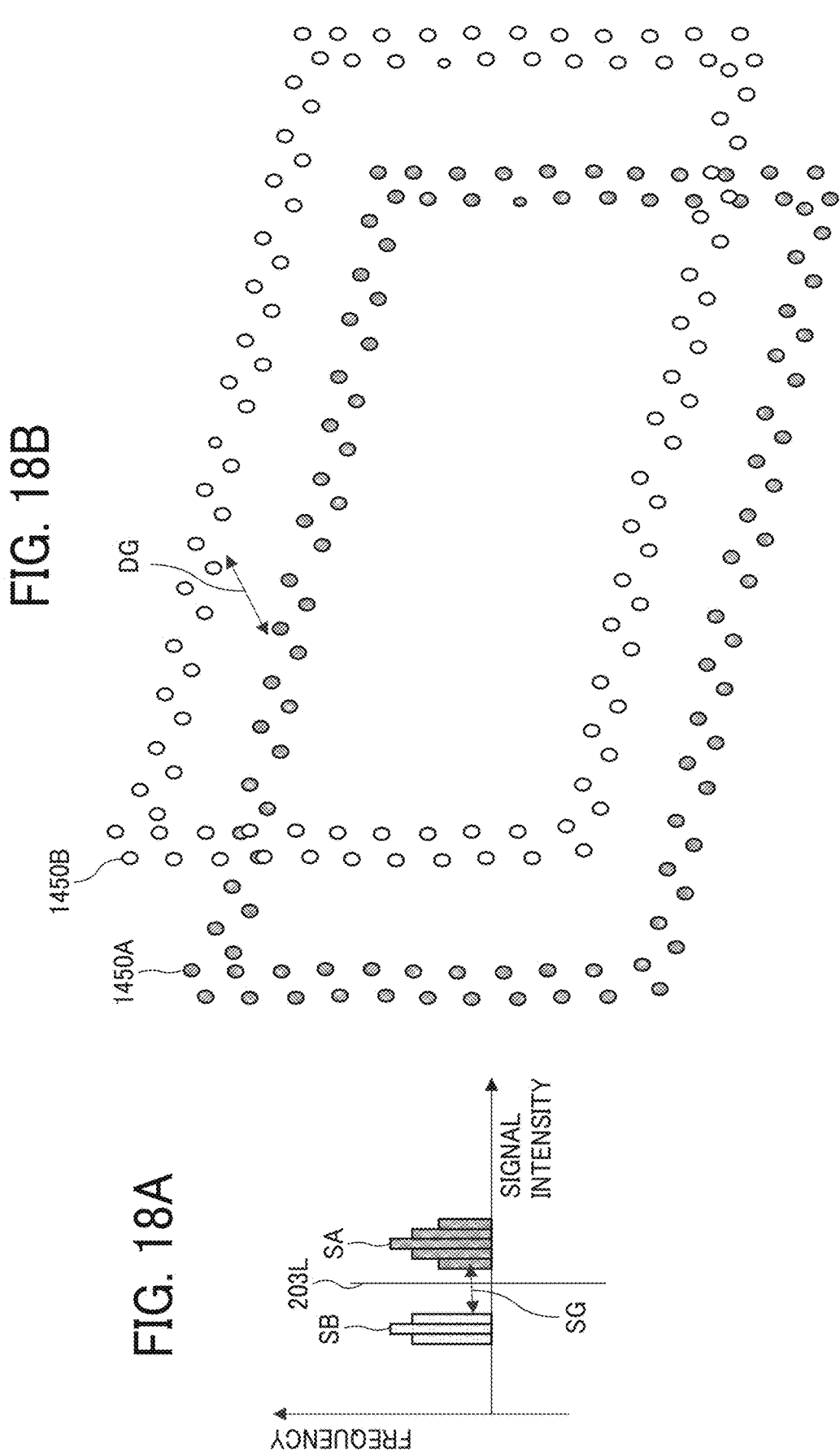
FIGS. 18A and 18B are diagrams each illustrating the distribution of a point cloud corresponding to a frame according to an embodiment of the present disclosure.

FIGS. 18A and 18B are diagrams each illustrating the distribution of a point cloud corresponding to a frame according to the present embodiment.

FIG. 18A illustrates the histogram of the signal intensities of the point clouds acquired by the laser scanner LS illustrated in FIG. 17B.

As illustrated in FIG. 18A, since there is a difference in signal intensity between the point cloud in front of the window position 203L and the point cloud behind the window position 203L, a bimodal histogram is obtained.

FIG. 18B is a diagram illustrating the relation between the front point cloud 1450A and the rear point cloud 1450B illustrated in FIG. 16B.

As illustrated in FIG. 18B, the window causes a gap DG between the front point cloud 1450A and the rear point cloud 1450B in the depth direction. The gap DG is the region having no 3D point cloud in the depth direction corresponding to the gap SG of the signal intensity illustrated in FIGS. 17B and 18A.

In the present embodiment, a threshold value is set to divide the histogram illustrated in FIG. 18A into two. The threshold value is set by, for example, the Otsu's method for thresholding in image processing based on the number of windows in the 3D model shape of the window set in the model information setting box 1235 in FIG. 6. Another thresholding method may be used.

By determining the point cloud SA having the signal intensity equal to or greater than the threshold value as the front point cloud in front of the window and the point cloud SB having the signal intensity below the threshold value as the rear point cloud at the rear of the window, the boundary between the front point cloud and the rear point cloud can be set.

The window is typically a plane. Accordingly, in Step S46 of FIG. 14, the processing unit 53 generates 3D shape information of the window using planar model shape information including the set number of windows, and adds the generated 3D shape information of the window to the position where the front point cloud 1450A and the rear point cloud 1450B can be separated most.

As described above, even when the frame is not determined to have a shape typical of window frames in Step S45 of FIG. 14, the determination unit 55 can determine that the frame is the window frame in Step S47 of FIG. 14 when a low-density region in which the three-dimensional point cloud has a density equal to or smaller than a threshold value is present between the first point cloud labeled as the first frame and the second point cloud labeled as the second frame.

Figures 19A, 19B:
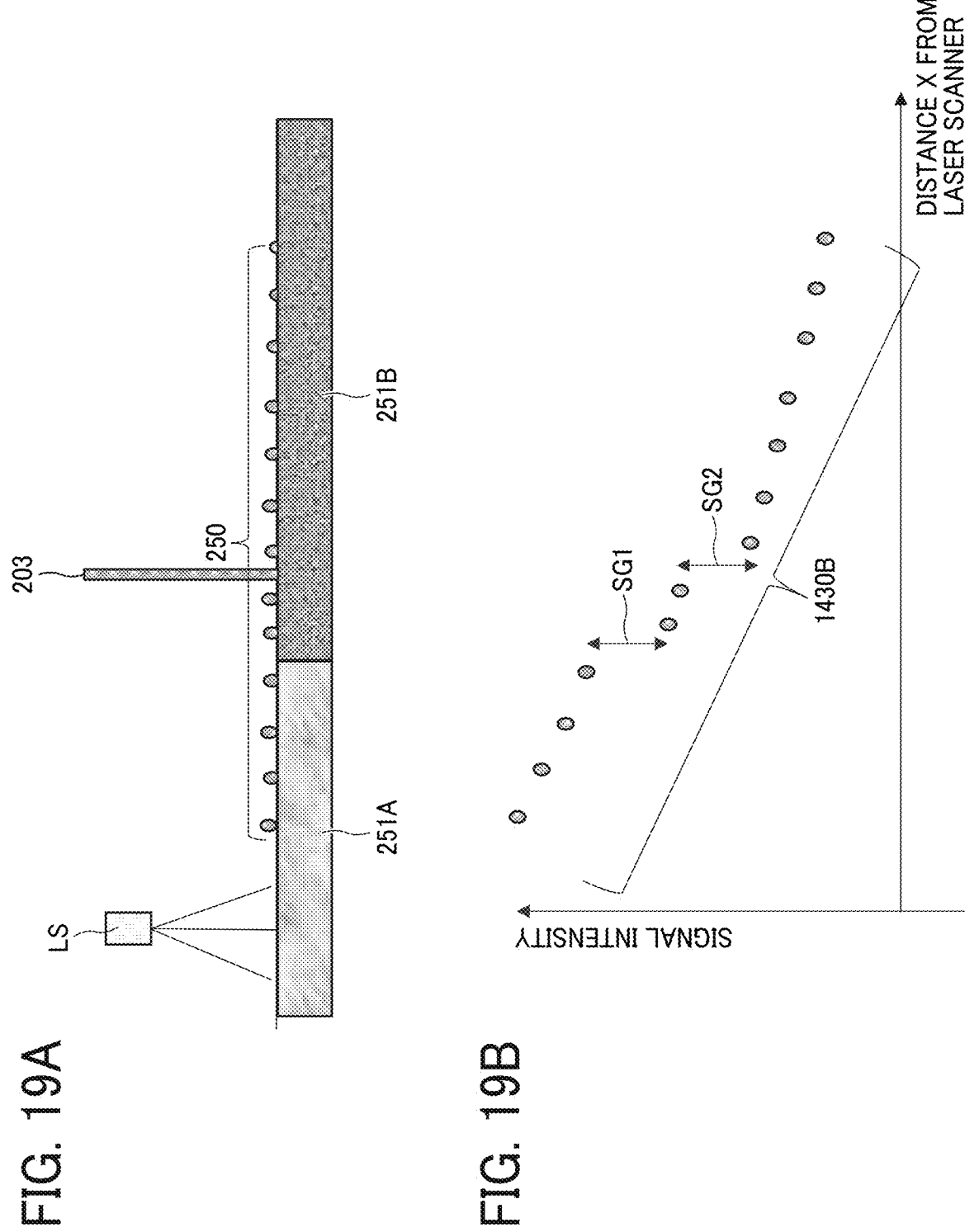
FIG. 19A is a diagram illustrating the relations among a laser scanner, multiple measurement points, and a window according to an embodiment of the present disclosure.
FIG. 19B is a diagram illustrating a gap in signal intensity due to differences in reflectance among the multiple measurement points in FIG. 19A.

FIGS. 19A and 19B are diagrams each illustrating a gap in signal intensity due to differences in reflectance among multiple measurement points according to the present embodiment.

FIG. 19A is a diagram illustrating the relative positions of the laser scanner LS, the multiple measurement points 250, and the window 203. The multiple measurement points 250 include the measurement points of a portion 251A having a high reflectance and the measurement points of a portion 251B having a low reflectance.

FIG. 19B illustrates the relation between the distance from the laser scanner LS and the signal intensity in the point cloud 1430B acquired by measuring the multiple measurement points 250 with the laser scanner LS.

When the multiple measurement points 250 include the measurement points of the portion 251A having a high reflectance and the measurement points of the portion 251B having a low reflectance, a gap SG1 of signal intensity occurs before and after the boundary between the portion 251A having a high reflectance and the portion 251B having a low reflectance. The gap SG1 of signal intensity is not distinguishable from a gap SG2 of signal intensity before and after the window 203.

Figures 20A, 20B:
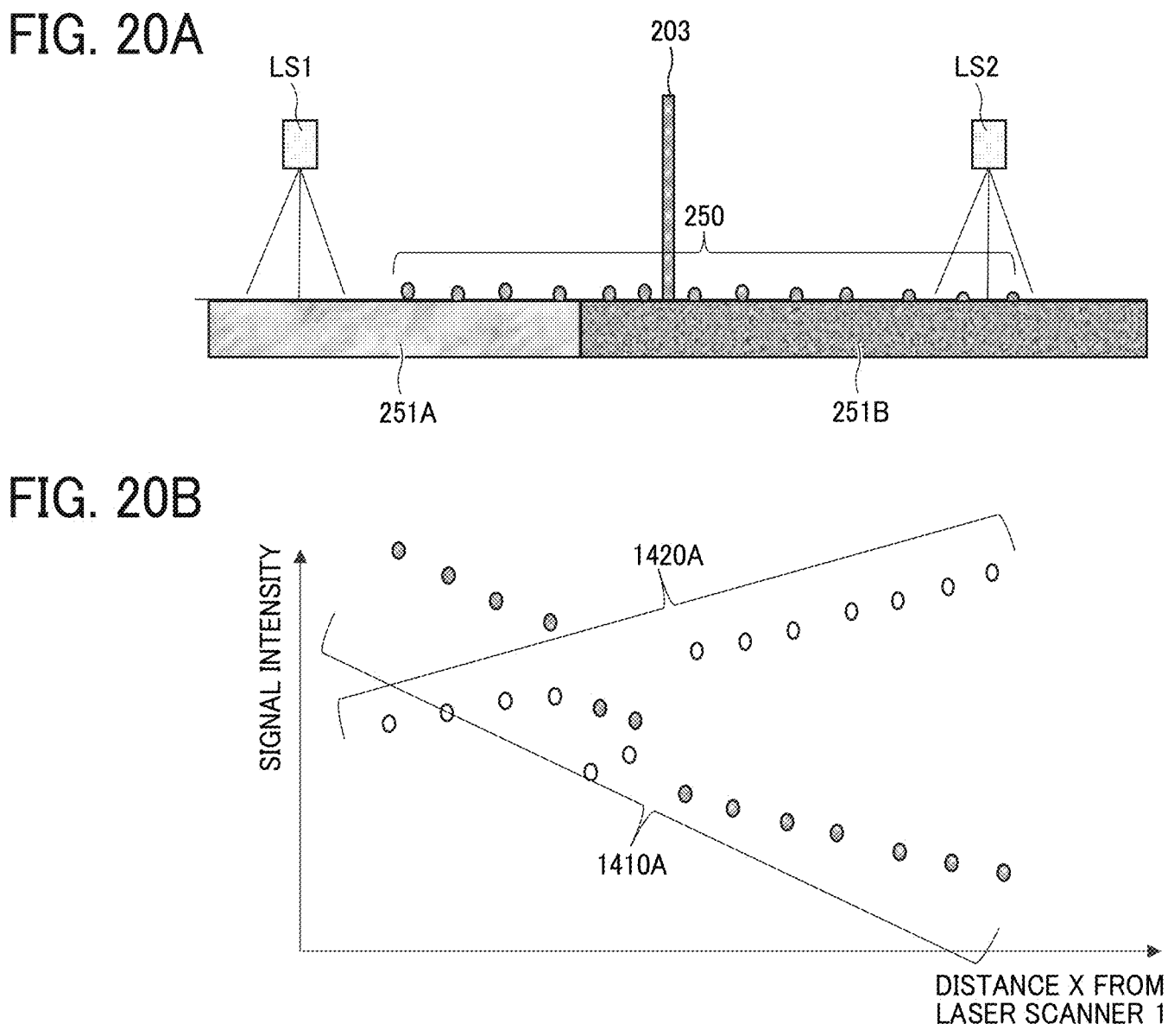

FIGS. 20A and 20B are diagrams each illustrating signal intensities of point clouds corresponding to a frame according to a modification of the above-described embodiments.

FIG. 20A is a diagram illustrating the relative positions of first and second laser scanners LS1 and LS2, the multiple measurement points 250, and the window 203. Similar to FIG. 19A, the multiple measurement points 250 include the measurement points of the portion 251A having a high reflectance and the measurement points of the portion 251B having a low reflectance.

The first laser scanner LS1 measures the multiple measurement points 250 from the left in the drawing, which is one side of the window 203 (one direction relative to the window 203), and the second laser scanner LS2 measures the multiple measurement points 250 from the right in the drawing, which is the opposite side of the window 203 (opposite direction relative to the window 203).

FIG. 20B illustrates the relation between the distance from the laser scanner LS1 and the signal intensity in a point cloud 1410A acquired by the laser scanner LS1 measuring the multiple measurement points 250 and a point cloud 1420A acquired by the laser scanner LS2 measuring the multiple measurement points 250.

According to FIG. 20B, a gap by a drop in the signal intensity is present between the front side and the rear side of the window 203 in the point cloud 1410A, and a gap by a drop of the signal intensity is present between the rear side and the front side of the window 203 in the point cloud 1420A.

By contrast, focusing on the boundary of the portion 251A having a high reflectance and the portion 251B having a low reflectance, a gap by a drop in the signal intensity is present between the front side and the rear side of the boundary in the point cloud 1410A, whereas a gap by a rise in the signal intensity is present between the rear side and the front side of the in the point cloud 1420A.

In other words, the attenuation of the reflection light by the window 203 reduces the signal intensity, but the change of the reflection light by the boundary between the portion 251A having a high reflectance and the portion 251B having a low reflectance reduces the signal intensity in some cases and increases in some cases.

Figure 21:
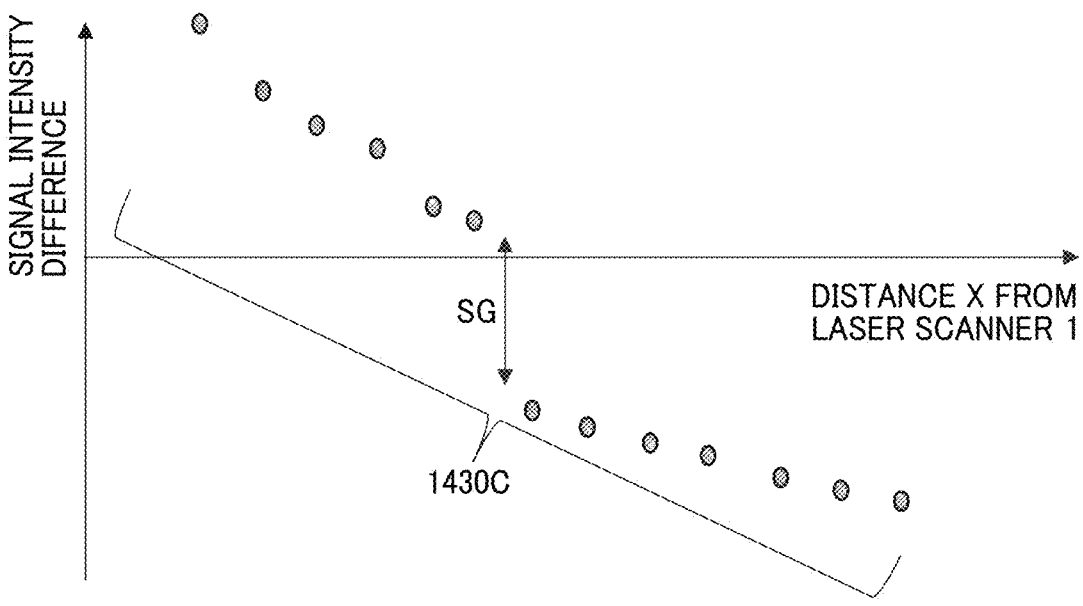
FIG. 21 is a graph illustrating the relation between the difference between the signal intensities of the point clouds illustrated in FIG. 20B and the distance from the laser scanner illustrated in FIG. 20A.

FIG. 21 is a graph illustrating the signal intensity of a point cloud corresponding to a frame according to the present modification of the above-described embodiments.

FIG. 21 illustrates the relation between a difference 1430C between the signal intensity of the point cloud 1410A in FIG. 20B and the signal intensity of the point clouds 1420A in FIG. 20B and the distance from the laser scanner LS1.

Similar to the signal intensity of the point cloud 1430 in FIG. 17B, the difference 1430C of the signal intensity illustrated in FIG. 21 has one gap SG of the signal intensity. Accordingly, the window and the window position 203L can be identified by using the gap SG.

Figure 22:
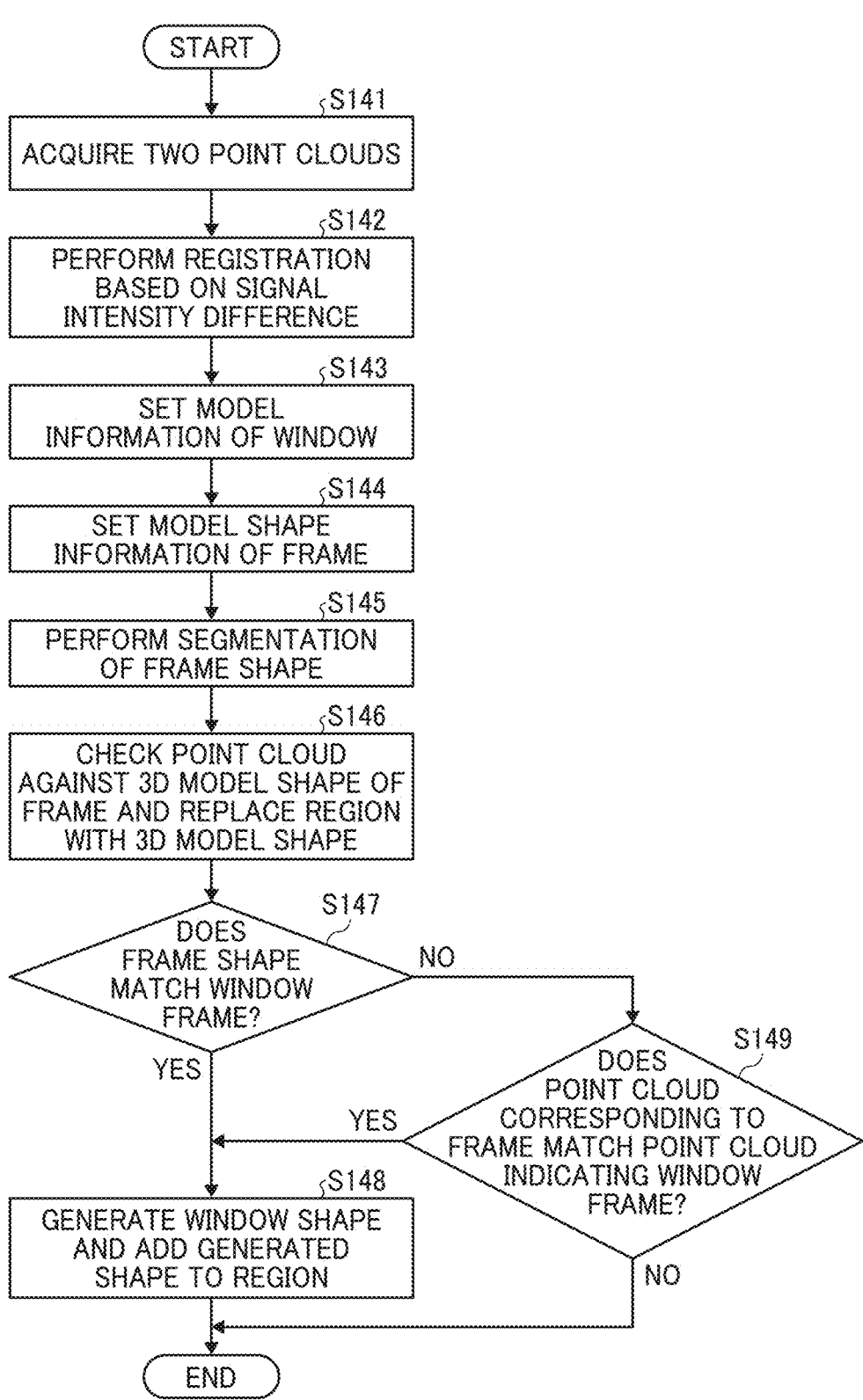
FIG. 22 is a flowchart of a process of 3D shape generation for a frame according to a modification of the above embodiments of the present disclosure.

FIG. 22 is a flowchart of a 3D shape generation process for a frame according to the present modification of the above-described embodiments. FIG. 22 illustrates the operation corresponding to Steps S21, S22, and S24 to S27 in FIG. 7.

The processing unit 53 of the management server 5 acquires two 3D point-cloud data retrieved by the storing and reading unit 59 (Step S141).

The two 3D point-cloud data acquired in Step S141 include a first 3D point cloud obtained by measuring the object from one side of the window 203 described with reference to FIG. 20A and a second 3D point cloud obtained by measuring the object from the opposite side of the window 203.

The processing unit 53 executes the registration of the first and second 3D point clouds based on the difference between the signal intensity of the 3D point cloud obtained by measuring the object from one side of the window 203 described in FIG. 21 and the signal intensity of the 3D point cloud obtained by measuring the object from the opposite side of the window 203, and converts the 3D point clouds into one unified 3D point cloud (Step S142).

The operation from S143 to S149 is similar to that from S41 to S47 in FIG. 14.

The present disclosure has the following aspects.

A management server 5 (an example of a 3D shape generation apparatus) according to a first aspect of the present disclosure includes the processing unit 53 (an example of the 3D shape generation means) to generate 3D shape information indicating a 3D shape corresponding to a 3D point cloud using model shape information indicating a 3D model shape. The model shape information includes model shape information of a frame, and the processing unit 53 generates 3D shape information of a frame using the model shape information of the frame based on point cloud information indicating the 3D point cloud.

Specifically, the processing unit 53 checks a specific region in the 3D point cloud against the 3D model shape of the frame indicated by the model shape information of the frame and replaces the specific region with using the 3D model shape of the frame. As a result, the 3D shape information of a frame can be appropriately generated.

In a second aspect, in the management server 5 according to the first aspect, the model shape information further includes window model shape information. A window is an example of a transparent member. When the frame is a window frame, the processing unit 53 generates 3D shape information of a window using the window model shape information and adds the 3D shape information to a region surrounded by the frame.

As a result, the 3D shape information of a window whose 3D point cloud is difficult to obtain can be added to the region surrounded by the frame.

In a third aspect, the management server 5 according to the second aspect further includes the determination unit 55 that determines that the frame is a window frame when the 3D shape information of the frame generated by the processing unit 53 indicates the window frame.

As a result, when the 3D shape information of the frame indicates a window frame, the window can be added to the region surrounded by the window frame.

In a fourth aspect, the management server 5 according to the second aspect further includes the determination unit 55 that determines that the frame is a window frame when the point cloud corresponding to the 3D shape information of the frame generated by the processing unit 53 indicates the window frame.

As a result, when the point cloud corresponding to the 3D shape information of the frame indicates a window frame, the window can be added to the region surrounded by the window frame.

In a fifth aspect, in the management server 5 according to the fourth aspect, the processing unit 53 performs segmentation for labeling a specific point cloud in the 3D point cloud, and the determination unit 55 determines that the frame is the window frame when a gap DG is present between the front point cloud 1450A (first point cloud) labeled as the front portion 207A of the window and the rear point cloud 1450B (second point cloud) labeled as the rear portion 207B of the window. The front portion 207A and the rear portion 207B are examples of the first frame and the second frame, respectively. The gap DG is an example of the low-density region in which the three-dimensional point cloud has a density equal to or smaller than a threshold value.

As a result, the determination unit 55 can determine that the frame is a window frame based on the front point cloud 1450A (first point cloud) and the rear point cloud 1450B (second point cloud) corresponding to the 3D shape information of the frame, and the gap DG therebetween.

In a sixth aspect, in the management server 5 according to the fifth aspect, the processing unit 53 performs registration for converting the first 3D point cloud acquired from one side of the frame and the second 3D point cloud acquired from the opposite side of the frame into one unified 3D point cloud, and performs the segmentation after the registration.

Accordingly, it can be determined that the gap DG, which is an example of the low-density region in which the three-dimensional point cloud has a density equal to or smaller than a threshold value, is caused due to not the change in the reflectance of the object but the window (i.e., a window pane made of a transparent material such as glass). Thus, the window can be accurately added to the region surrounded by the frame.

In a seventh aspect, in the management server 5 according to the fifth or sixth aspect, the determination unit 55 determines that the frame is a window frame based on the number of windows to be overlapped. As a result, the window can be added to the region surrounded by the frame with high accuracy.

In an eighth aspect, the management server 5 according to any one of the first to seventh aspects further includes the transmission and reception unit 51 that transmits the 3D shape information of the frame to the communication terminal 3 that communicates with the 3D shape generation apparatus.

This allows the 3D shape information of the frame to be checked on the communication terminal 3.

In a ninth aspect, in any one of the first to seventh aspects, the communication terminal 3 to which the function of the management server 5 is integrated further includes a display control unit 34 that displays the 3D shape information of the frame on the display 308. As a result, the 3D shape information of the frame can be checked on the communication terminal 3 in which the function of the management server 5 is integrated.

In a tenth aspect, a 3D shape generation method executed by the management server 5 according to one embodiment of the present disclosure includes generating 3D shape information indicating a 3D shape corresponding to a 3D point cloud using model shape information indicating a 3D model shape. The model shape information includes model shape information of a frame. In the generating, 3D shape information of a frame is generated based on point cloud information indicating the 3D point cloud, using the model shape information of the frame.

In an eleventh aspect, a program according to an embodiment of the present disclosure causes a computer to execute the 3D shape generation method according to the tenth aspect.

A 3D shape generation system according to a twelfth aspect includes the management server 5 and the communication terminal 3 to communicate with the management server 5.

The management server 5 generates 3D shape information indicating a 3D shape corresponding to a 3D point cloud using model shape information indicating a 3D model shape. The management server 5 includes the processing unit 53 that generates 3D shape information of a frame based on point cloud information indicating 3D point cloud, using model shape information of a frame included in the model shape information, and the transmission and reception unit 51 that transmits the 3D shape information of the frame to the communication terminal 3. The communication terminal 3 includes the transmission and reception unit 31 that receives the 3D shape information of the frame from the management server 5, and the display control unit 34 that displays on the display 308 the 3D shape information of the frame.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A three-dimensional shape generation apparatus comprising
  circuitry configured to generate three-dimensional shape information indicating a three-dimensional shape corresponding to a three-dimensional point cloud, using model shape information indicating a three-dimensional model shape,
  wherein the model shape information includes model shape information of a frame, and
  wherein the circuitry is configured to generate three-dimensional shape information of the frame using the model shape information of the frame based on point cloud information indicating the three-dimensional point cloud.

2. The three-dimensional shape generation apparatus according to claim 1,
  wherein the model shape information further includes model shape information of a transparent member, and
  wherein, in a case that the frame is a frame of a transparent member, the circuitry is configured to:
    generate three-dimensional shape information of the transparent member using the model shape information of the transparent member; and
    add the three-dimensional shape information of the transparent member to a region surrounded by the frame.

3. The three-dimensional shape generation apparatus according to claim 2,
  wherein the circuitry is further configured to determine that the frame is the frame of the transparent member in a case that the three-dimensional shape information of the frame indicates the frame of the transparent member.

4. The three-dimensional shape generation apparatus according to claim 2,
  wherein the circuitry is further configured to determine that the frame is the frame of the transparent member in a case that a point cloud corresponding to the three-dimensional shape information of the frame indicates the frame of the transparent member.

5. The three-dimensional shape generation apparatus according to claim 4,
  wherein the circuitry is configured to:
    perform segmentation for labeling a specific point cloud in the three-dimensional point cloud; and
    determine that the frame is the frame of the transparent member in a case that a low-density region is present between a first point cloud labeled as a first frame and a second point cloud labeled as a second frame by the segmentation, the low-density region being a region in which the three-dimensional point cloud has a density equal to or smaller than a threshold value.

6. The three-dimensional shape generation apparatus according to claim 5,
  wherein the circuitry is configured to:
    perform registration for converting a first three-dimensional point cloud acquired by measurement from a first side of the frame and a second three-dimensional point cloud acquired by measurement from a second side opposite the first side of the frame into one unified three-dimensional point cloud; and
    perform the segmentation after the registration.

7. The three-dimensional shape generation apparatus according to claim 2,
  wherein the point cloud information includes information on signal intensities of the three-dimensional point cloud, and the circuitry is configured to determine that the frame is the frame of the transparent member based on a gap in the signal intensities.

8. The three-dimensional shape generation apparatus according to claim 1,
  wherein the circuitry is further configured to transmit the three-dimensional shape information of the frame to a communication terminal that communicates with the three-dimensional shape generation apparatus.

9. The three-dimensional shape generation apparatus according to claim 1,
  wherein the circuitry is further configured to display the three-dimensional shape information of the frame on a display.

10. A three-dimensional shape generation system comprising:
  the three-dimensional shape generation apparatus according to claim 1; and
  a communication terminal,
  wherein the circuitry of the three-dimensional shape generation apparatus is further configured to transmit the three-dimensional shape information of the frame to the communication terminal, and
  wherein the communication terminal includes terminal circuitry configured to:
    receive the three-dimensional shape information of the frame from the three-dimensional shape generation apparatus; and
    display the three-dimensional shape information of the frame on a display.

11. A method for generating a three-dimensional shape, the method comprising
  generating three-dimensional shape information indicating a three-dimensional shape corresponding to a three-dimensional point cloud, using model shape information indicating a three-dimensional model shape,
  wherein the model shape information includes model shape information of a frame, and
  wherein the generating includes generating three-dimensional shape information of the frame using the model shape information of the frame based on point cloud information indicating the three-dimensional point cloud.

12. The method for generating the three-dimensional shape according to claim 11,
  wherein the model shape information further includes model shape information of a transparent member, and wherein, in a case that the frame is a frame of a transparent member:

generating three-dimensional shape information of the transparent member using the model shape information of the transparent member; and adding the three-dimensional shape information of the transparent member to a region surrounded by the frame.

13. The method for generating the three-dimensional shape according to claim 12, further including determining that the frame is the frame of the transparent member in a case that the three-dimensional shape information of the frame indicates the frame of the transparent member.

14. The method for generating the three-dimensional shape according to claim 12, further including determining that the frame is the frame of the transparent member in a case that a point cloud corresponding to the three-dimensional shape information of the frame indicates the frame of the transparent member.

15. The method for generating the three-dimensional shape according to claim 14, further including performing segmentation for labeling a specific point cloud in the three-dimensional point cloud; and determining that the frame is the frame of the transparent member in a case that a low-density region is present between a first point cloud labeled as a first frame and a second point cloud labeled as a second frame by the segmentation, the low-density region being a region in which the three-dimensional point cloud has a density equal to or smaller than a threshold value.

16. A non-transitory recording medium storing a plurality of program codes which, when executed by one or more processors, causes the one or more processors to perform a method, the method comprising generating three-dimensional shape information indicating a three-dimensional shape corresponding to a three-dimensional point cloud, using model shape information indicating a three-dimensional model shape, wherein the model shape information includes model shape information of a frame, and wherein the generating includes generating three-dimensional shape information of the frame using the model shape information of the frame based on point cloud information indicating the three-dimensional point cloud.

17. The method according to claim 16, wherein the model shape information further includes model shape information of a transparent member, and wherein, in a case that the frame is a frame of a transparent member:

generating three-dimensional shape information of the transparent member using the model shape information of the transparent member; and adding the three-dimensional shape information of the transparent member to a region surrounded by the frame.

18. The method according to claim 17, further including determining that the frame is the frame of the transparent member in a case that the three-dimensional shape information of the frame indicates the frame of the transparent member.

19. The method according to claim 17, further including determining that the frame is the frame of the transparent member in a case that a point cloud corresponding to the three-dimensional shape information of the frame indicates the frame of the transparent member.

20. The method according to claim 19, further including performing segmentation for labeling a specific point cloud in the three-dimensional point cloud; and determining that the frame is the frame of the transparent member in a case that a low-density region is present between a first point cloud labeled as a first frame and a second point cloud labeled as a second frame by the segmentation, the low-density region being a region in which the three-dimensional point cloud has a density equal to or smaller than a threshold value.

* * * * *